United States Patent [19]

Preikschat

[11] 4,363,999

[45] Dec. 14, 1982

[54] ELECTRIC PROPULSION AND BRAKING SYSTEM FOR AUTOMOTIVE VEHICLES

[76] Inventor: Fritz K. Preikschat, 16020 Lake Hills Blvd., Bellevue, Wash. 98008

[21] Appl. No.: 168,172

[22] Filed: Jul. 14, 1980

[51] Int. Cl.$^3$ .............................................. H02P 1/54
[52] U.S. Cl. ...................................... 318/53; 318/63; 318/65; 318/69; 318/139
[58] Field of Search ............... 318/139, 49, 50, 51, 318/53, 54, 63, 65, 69, 87, 88, 759–761, 261, 273, 302, 34, 111–113; 180/65 R, 65 B, 65 C, 65 F, 60; 310/46

[56] References Cited

U.S. PATENT DOCUMENTS

| | | | |
|---|---|---|---|
| 3,109,972 | 11/1963 | Edwards | 318/55 |
| 3,244,117 | 4/1966 | Yuhas | 105/96.1 |
| 3,387,194 | 6/1968 | Banks | 318/139 |
| 3,421,596 | 1/1969 | Christenson et al. | 180/44 |
| 3,454,122 | 7/1969 | Grady | 318/139 X |
| 3,477,536 | 11/1969 | Carini | 180/65 |
| 3,514,681 | 5/1970 | Dorn et al. | 318/139 |
| 3,596,160 | 7/1971 | Rakes | 318/261 X |
| 3,608,659 | 9/1971 | Gardner | 180/65 X |
| 3,628,110 | 12/1971 | Casaday | 318/761 X |
| 3,688,169 | 8/1972 | Yamaya et al. | 318/376 X |
| 3,699,416 | 10/1972 | Sloan et al. | 318/761 |
| 3,899,041 | 8/1975 | Mager | 318/139 X |
| 4,052,647 | 10/1977 | Thompson | 318/139 |
| 4,082,988 | 4/1978 | Reime et al. | 318/376 X |

OTHER PUBLICATIONS

Fitzgerald et al., *Electric Machinery*, pp. 5533, 137–141, 146–149, (1952).
Pender et al., Ed. *Electrical Engineer's Handbook*, pp. 8–39 to 8–40, (1949).
Collie, *Electric and Hybrid Vehicles*, pp. 1, 97–121, 151–255, 301–346, 429, 499–544, (1979).

*Primary Examiner*—Ulysses Weldon
*Attorney, Agent, or Firm*—Christensen, O'Connor, Johnson & Kindness

[57] ABSTRACT

An electric propulsion and braking system which includes a plurality of high-speed, dc commutatorless motors each coupled to a wheel of an automotive vehicle through an associated fixed-ratio mechanical transmission. Each motor includes a field winding, an armature winding, and a commutation circuit for the armature winding. During propulsion, each commutation circuit is enabled and, during braking, each commutation circuit is disabled. Control of the amount of propulsion and braking is afforded by varying the dc source voltage across each commutation circuit and by varying the field current in each field winding. The dc source voltage across each commutation circuit is varied by connecting the commutation circuits and a plurality of main electrical energy sources in selected series, series/parallel, and parallel combinations. The field current in each field winding is varied by connecting the field windings with an auxiliary electrical energy source in selected series, series/parallel and parallel combinations, and by duty-cycling the selected combination. The various series, series/parallel and parallel combinations are selected by, and the duty-cycling of the selected field winding combination is controlled by, a microprocessor receiving signals representing the magnitude of electrical energy transfer between the main electrical energy sources and the motors, the position of an acceleration pedal, the position of a brake pedal, the velocity of the vehicle, the dc source voltage across each commutation circuit, and the armature voltage across each armature winding.

35 Claims, 20 Drawing Figures

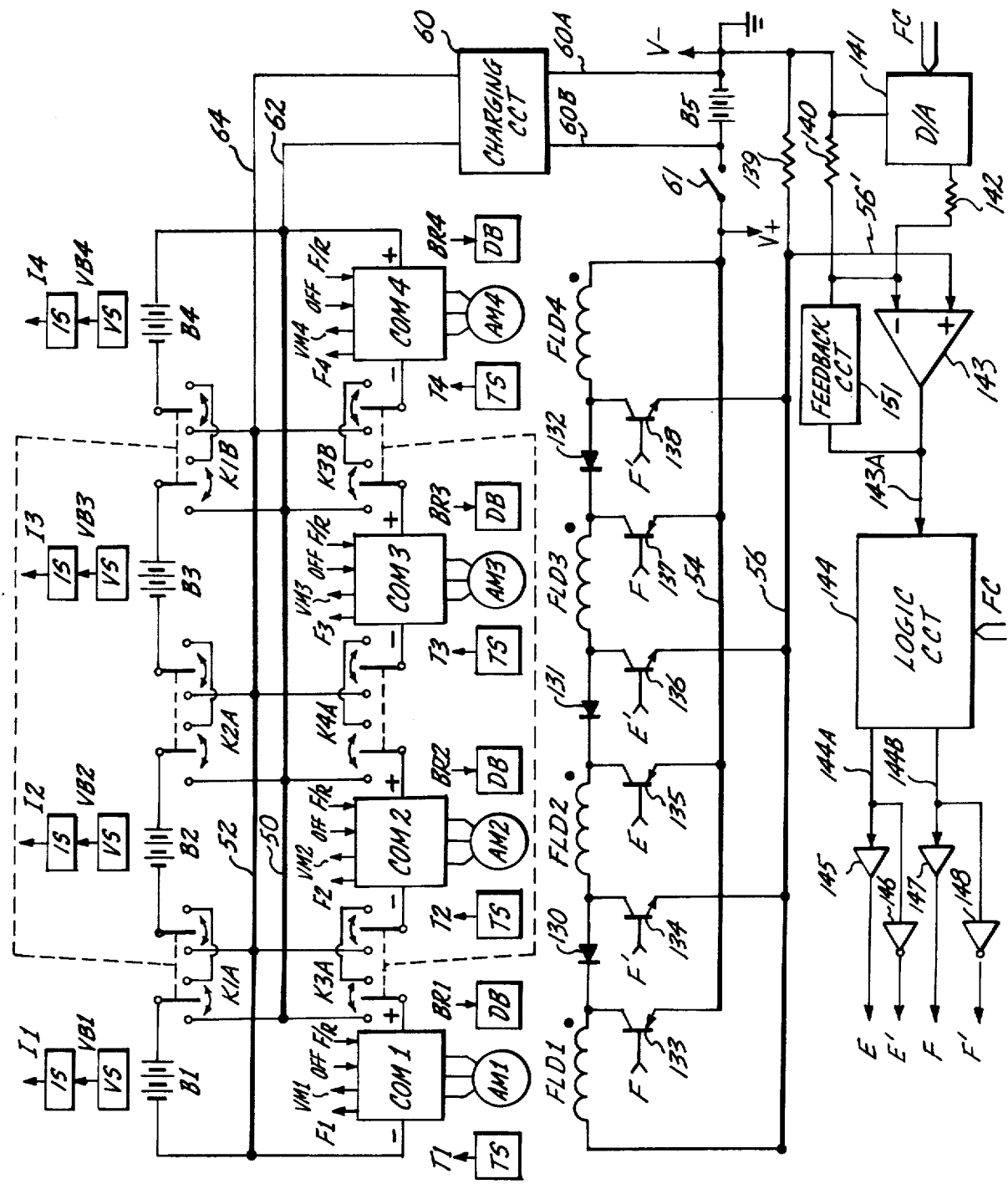
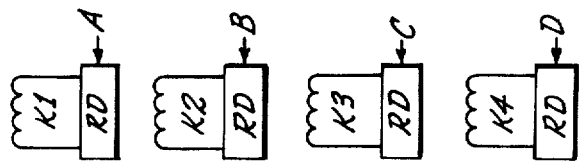
Fig. 2.

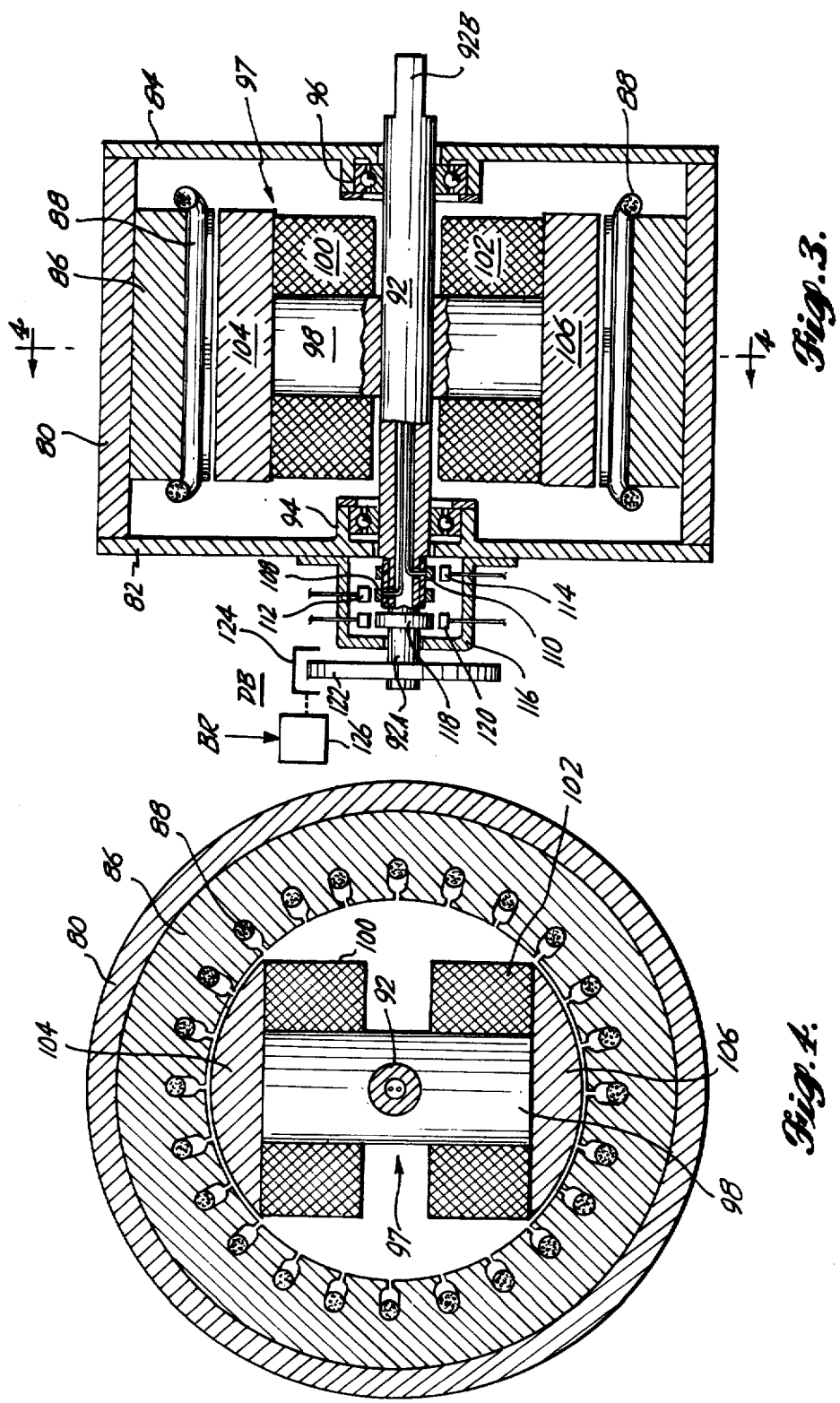

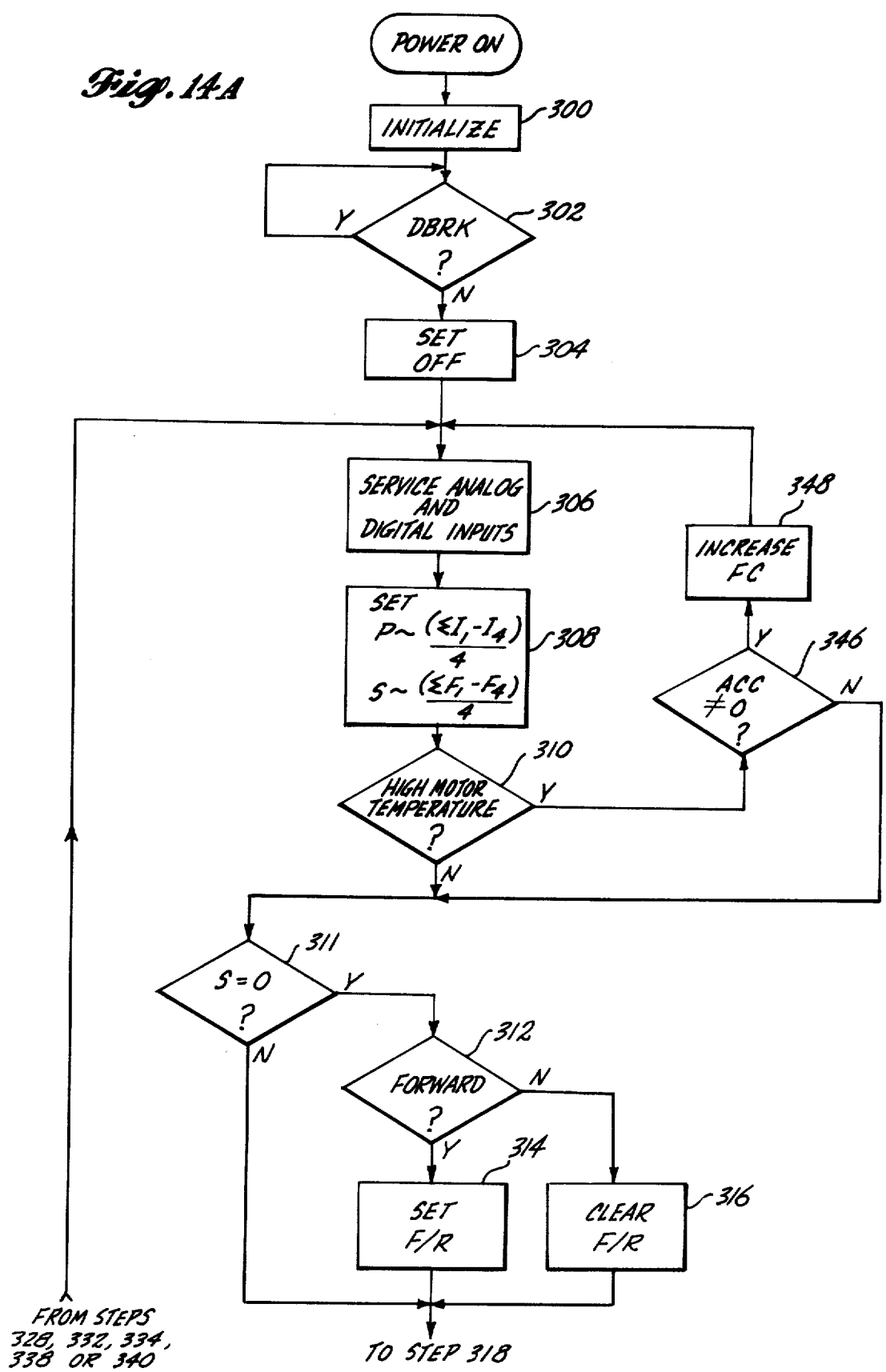

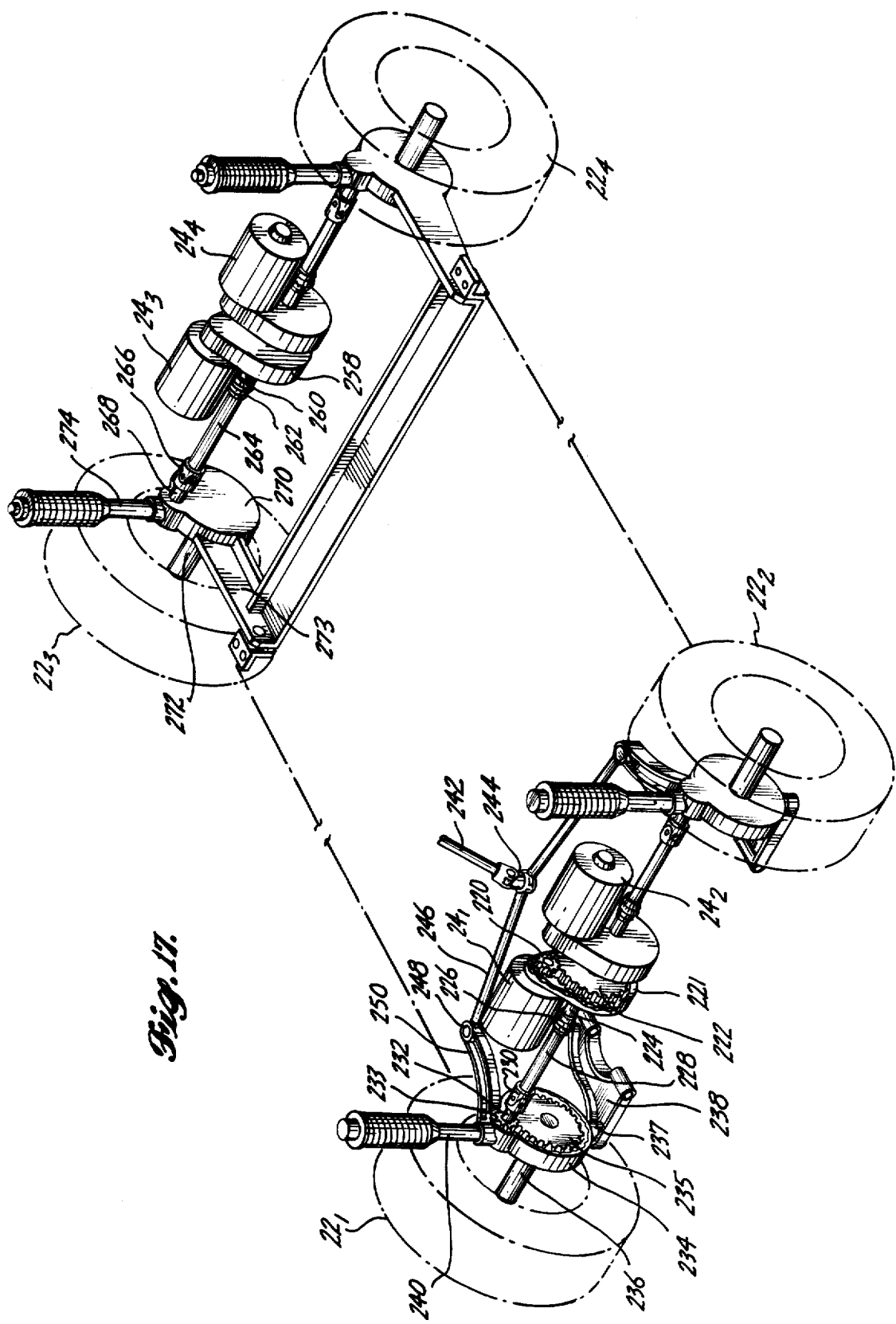

ELECTRIC PROPULSION AND BRAKING SYSTEM FOR AUTOMOTIVE VEHICLES

FIELD OF THE INVENTION

This invention generally relates to the field of automotive vehicles, and, more particularly, to electric propulsion and braking systems for automotive vehicles.

BACKGROUND OF THE INVENTION

The inefficiency of fossil-fuel prime movers currently being used in propulsion systems for automotive vehicles is well known. For example, the gasoline internal combustion engine has an efficiency of approximately 22%, whereas the diesel internal combustion engine has an efficiency of approximately 35%. When one also considers the mechanical losses that result from the use of a variable-ratio, mechanical transmission and other elements for coupling the fossil-fuel prime mover to the driving wheels of the automotive vehicle, it can be seen that the overall efficiency of the vehicle, in extracting energy from fossil fuels and delivering the extracted energy in the form of rotational motion of the driving wheels, is quite low.

It has been known for many years that electric motors are capable of very high efficiencies in converting electrical energy into mechanical energy. Accordingly, many types of electric propulsion systems for automotive vehicles have been proposed. In such systems, electrical energy is obtained from an electrical energy source, typically a bank of rechargeable batteries, and is converted by an electrical motor into rotational motion of an output shaft of the motor. The output shaft is coupled to the driving wheels through a variable-ratio mechanical transmission, universal joints, and the like, in order to permit efficient energy conversion over a plurality of predetermined speed ranges. Such electric propulsion systems are additionally advantageous over propulsion systems using a fossil-fuel prime mover in that regenerative braking can be accomplished by causing the electrical motor to act as a generator, whereby a portion of the energy developed during braking, normally lost as heat by the mechanical brakes of the vehicle, is fed back to the electrical energy source.

For a number of reasons, electric propulsion and braking systems for automotive vehicles have found only limited acceptance. One of these reasons is the lack of significant energy storage capacity of currently-available rechargeable batteries. As a result, a large bank of such rechargeable batteries must be used in order to achieve an acceptable operation range for the vehicle. Although other electrical energy sources, such as the hydrogen fuel cell, have been proposed which are capable of providing more electrical energy per unit of size and of weight, such other electrical energy sources have not been heretofore available in inexpensive, production quantities.

Because of the large number and weight of rechargeable batteries that are required, the electric propulsion and braking system must be compact in size and low in weight in order to develop an overall efficiency of energy conversion for the vehicle which is significantly superior to that currently available from propulsion systems using fossil-fuel prime movers.

In order to propel an automotive vehicle of average size at freeway speeds, and to provide adequate reserve power for maintaining freeway speeds under varying grade conditions and for passing, the electrical motor should have a horsepowr capacity in the range of 40-60 horsepower. Unfortunately, currently available electric motors of this horsepower capacity are too large and bulky for use in an automotive vehicle, particularly when the size and bulk of the rechargeable batteries and of the variable-ratio mechanical transmission are also considered. Therefore, electric propulsion and braking systems typically use a smaller electrical motor and have been incorporated only in automotive vehicles which are capable of maintaining fairly low speeds over a limited range of operation.

It is therefore an object of this invention to provide an improved electric propulsion and braking system for automotive vehicles.

It is another object of this invention to provide a system which has an efficiency of electrical-mechanical energy conversion significantly greater than that accorded by previous electrical propulsion and braking systems.

It is yet another object of this invention to provide such a system which permits an automotive vehicle in which the system is installed to be capable of running at freeway speeds over an extended operating range, with adequate reserve power for maintaining freeway speeds and for passing.

It is a further object of this invention to provide such a system which affords gross speed and power range control for rotating and braking the wheels of an automotive vehicle through control of electrical energy transferred between a plurality of electrical motors each directly coupled to a wheel of the vehicle and a plurality of electrical energy sources.

It is yet a further object of this invention to provide such a system in which electrical-mechanical energy conversion is accomplished by controlling energy flow between the electrical energy sources and the electrical motors through the use of a programmed microprocessor.

It is still a further object of this invention to provide an electric propulsion and braking system which is smaller and lighter than the electric propulsion and braking systems of the prior art.

SUMMARY OF THE INVENTION

In brief, the foregoing objects and other objects and advantages that will be apparent from a consideration of the following portion of the specification are achieved in an electric propulsion and braking system for an automotive vehicle including a plurality of wheels.

The system comprises:

a plurality of high-speed, dc motors, each of the motors including a rotatable output shaft, an armature winding, a field winding that is adapted for excitation separate from excitation of the armature winding, and a commutation circuit coupled with the armature winding, the commutation circuit having a pair of terminals and being adapted, when enabled, to commutate a dc source voltage applied across the pair of terminals of the commutation circuit so as to develop an armature voltage across the armature winding to accordingly enable transfer of electrical energy to the armature winding, whereby the motor exerts rotational force on the output shaft, the commutation circuit being adapted, when disabled, to couple the armature voltage across the armature winding to the pair of terminals of the commutation circuit so as to enable transfer of electrical energy from the armature winding, whereby the motor exerts a braking force on the output shaft when the armature voltage exceeds the dc source voltage applied across the pair of terminals of the commutation circuit, the magnitude of the rotational and braking forces being dependent on the magnitude of the dc source voltage across the commutation circuit and the magnitude of field current through the field winding;

a plurality of fixed-ratio mechanical transmissions each being adapted to couple the output shaft of one of the plurality of motors to one of the plurality of wheels;

first control means including a plurality of main electrical energy sources for applying, in response to a first control signal, one of a plurality of dc source voltages to the pair of terminals of each of the commutation circuits, each dc source voltage having a predetermined magnitude which represents a gear of the vehicle and which differs from the predetermined magnitude of each other dc source voltage;

second control means including an auxiliary energy source for varying, in response to a second control signal, the field current in each field winding; and third control means for enabling propulsion and braking by respectively enabling and disabling the commutation circuits, and for varying the level of rotational and braking forces developed during propulsion and braking by providing the first and the second control signals to the first and the second control means, respectively.

BRIEF DESCRIPTION OF THE DRAWINGS

The invention can best be understood by reference to the following portion of the specification, taken in conjunction with the accompanying drawings in which:

FIG. 2 is an electrical schematic and block diagram of a first portion of a preferred embodiment of the electric propulsion and braking system;

FIG. 3 is a side cross-sectional view of an electrical motor and an integral shaft position sensor and auxiliary brake particularly adapted for use in the electric propulsion and braking system;

FIG. 4 is an end section view of the electrical motor, taken along the lines 4—4 in FIG. 3;

FIGS. 14A and 14B are a flow chart of the program steps executed by the microprocessor in a main program loop;

DESCRIPTION OF THE PREFERRED EMBODIMENT

Figure 1:
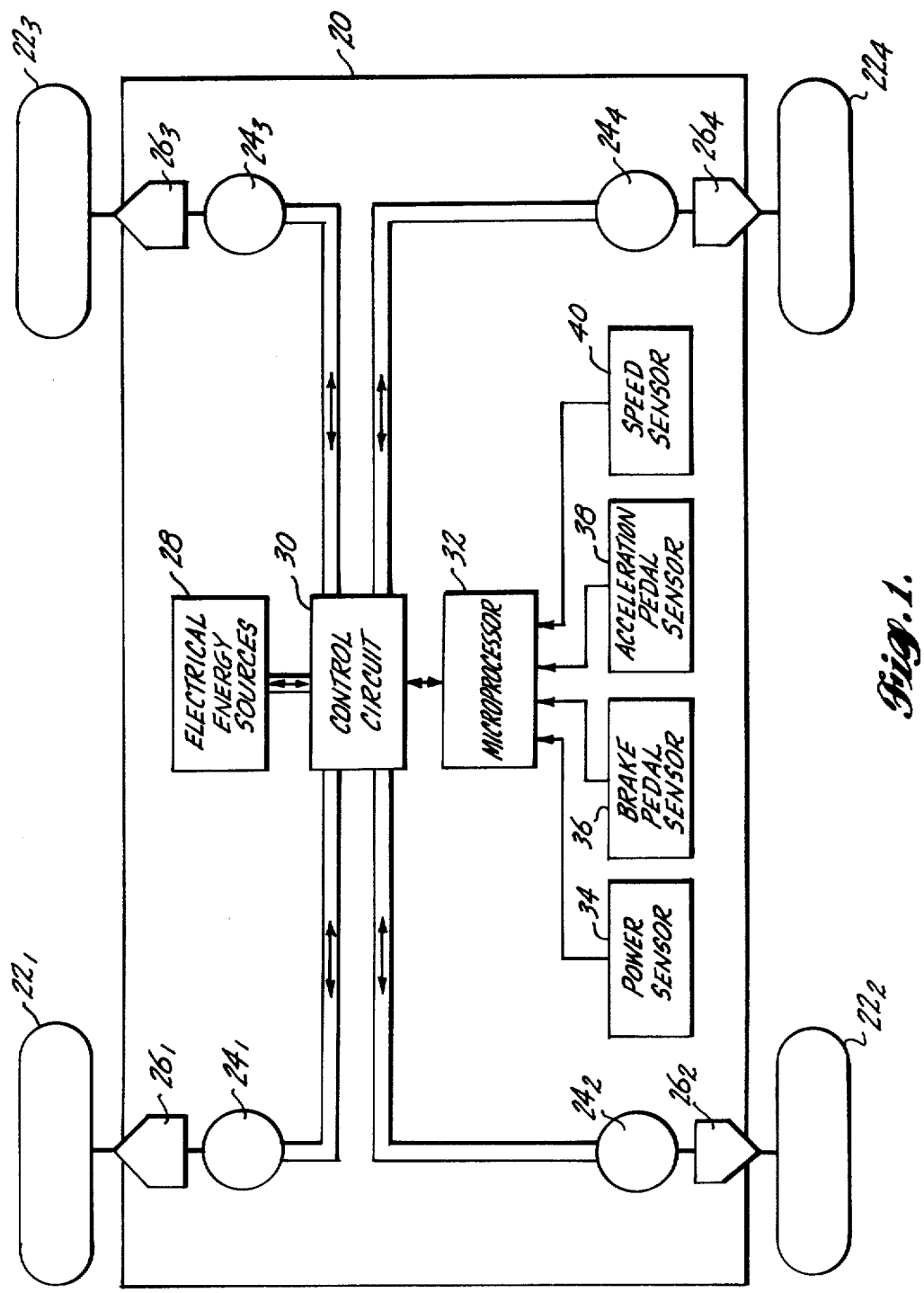
FIG. 1 is a block diagram of an automotive vehicle incorporating the electrical propulsion and braking system of the present invention.

With reference now to FIG. 1, an automotive vehicle 20 has a pair of front wheels $22_1$, $22_2$ and a pair of rear wheels $22_3$, $22_4$. Wheels $22_1$, $22_2$, $22_3$ and $22_4$ are each rotated and braked by an associated one of a plurality of high-speed, dc electrical motors $24_1$, $24_2$, $24_3$ and $24_4$. The output shaft of each motor is coupled to its associated wheel through an associated one of a plurality of fixed-ratio, mechanical transmissions $26_1$, $26_2$, $26_3$ and $26_4$. Reference will be made hereinafter (in conjunction with FIG. 17) to the physical details of the mounting and suspension of the motors, transmissions, and wheels on the automotive vehicle.

Each motor is a commutatorless, dc motor and preferably has a horsepower rating in the range of 10-15 horsepower and a maximum rotational speed of approximately 15,000 rpm. Although the total horsepower rating of the motors is thus equivalent to that required for freeway driving, the total weight of the motors is significantly less than that of a single dc motor having an equivalent horsepower rating, primarily due to the high speed of the motors. For example, a single dc motor of conventional design having a horsepower rating of 40 horsepower and having a maximum rotational speed of 3,600 rpm weighs about 550 lbs., whereas a dc motor having a horsepower rating of 10 horsepower and a maximum rotational speed of 15,000 rpm weighs about 40 lbs. It is presently anticipated that the total weight of the motors $24_1$-$24_4$ and associated transmissions $26_1$-$26_4$ will be about 200 lbs., which is significantly less than the weight of a single dc motor of equivalent horsepower rating, disregarding the additional weight of the variable-ratio mechanical transmission used to couple the output shaft of the single dc motor to the wheels. In addition, the bulk of a single dc motor of equivalent horsepower rating makes such a motor impractical for use in compact automotive vehicles, whereas the smaller motors $24_1$-$24_4$ can be easily accommodated in practically any automotive vehicle chassis. The association of each motor with a single wheel also allows the automotive vehicle 20 to have a better weight distribution than automotive vehicles using a single dc motor.

The construction and operation of each of the motors $24_1$-$24_4$ will be described hereinafter with reference to FIGS. 2-9, and 13-17. In summary, the mechanical energy delivered by each motor (in the form of mechanical rotation of its output shaft) is varied by a microprocessor 32 through control of the voltage applied to and the field current in the motor. To accomplish braking of the associated wheel, the motor is caused to act as a generator, whereby the generator action of the motor exerts a braking force on the associated wheel. The amount of braking is also varied by the microprocessor 32 through control of the voltage applied to and field current in the motor.

Each of the transmissions $26_1-26_4$ may be of the type described hereinafter with reference to FIG. 17, and preferably includes a gear train having a transmission ratio. In the preferred embodiment, the fixed transmission ratio is 1:25. When one considers such a transmission ratio and also a maximum rotational speed of 15,000 rpm for each motor, it can be seen that the automotive vehicle 20 can be propelled at speeds up to 100 km/hr.

Electrical energy for propelling the automotive vehicle 20 is obtained from a plurality of electrical energy sources 28 which, in the preferred embodiment of the invention, comprise a plurality of rechargeable batteries as shown in FIG. 2. The electrical energy sources 28, however, may also comprise a plurality of hydrogen fuel cells, or an internal combustion engine and an integral electrical generator having a plurality of armature windings each connected in parallel with one of a plurality of rechargeable batteries, or, any other type of rechargeable electrical energy source for which control can be made of the electrical energy transferred from and to the source.

Electrical energy sources 28 are interconnected with the motors $24_1-24_4$ by a control circuit 30. In the preferred embodiment of the invention as shown in FIG. 2, electrical energy sources 28 include four main rechargeable batteries and an auxiliary rechargeable battery. Control circuit 30 comprises a plurality of relays. A first group of the relays is used to connect the four main rechargeable batteries in selectable series, series/parallel and parallel combinations with a positive main bus and a negative main bus. A second group of the relays is used to connect the motors $24_1-24_4$ in selectable series, series/parallel and parallel combinations with the positive and negative main busses. By selection of a particular combination of the four main rechargeable batteries and a particular combination of the motors, the battery voltage impressed across each motor may be varied. The positive and negative main busses are coupled through a charging circuit to the auxiliary rechargeable battery so as to maintain the auxiliary rechargeable battery in a fully-charged condition at all times. Control circuit 30 also comprises a plurality of semiconductor switches which are used to connect the field windings of motors $24_1-24_4$ in selectable series, series/parallel and parallel combinations with a positive auxiliary bus and a negative auxiliary bus coupled to respective positive and negative terminals of the auxiliary rechargeable battery. By selecting a particular combination of the field windings $24_{1-244}$ with the positive and negative auxiliary busses, the field current in each field winding may be varied in discrete steps. In addition, the semiconductor switches are duty-cycled in order to finely regulate the field current in each field winding. By varying the battery voltage across each motor and by varying the field current in each field winding, microprocessor 32 may control the amount of electrical energy transferred from electrical energy sources 28 to motors $24_1-24_4$ during propulsion and may control the amount of electrical energy transferred from motors $24_1-24_4$ to electrical energy sources 28 during braking.

Microprocessor 32 receives input signals from a power sensor 34, a brake pedal sensor 36, an acceleration pedal sensor 38, and a speed sensor 40. The signal from power sensor 34 represents the actual rate of energy being transferred between electrical energy source 28 and motors $24_1-24_4$. In the preferred embodiment of the invention, power sensor 34 comprises a current sensor for each main rechargeable battery, with signals from the current sensors being averaged within microprocessor 32 to obtain information related to actual power transfer. The signals from brake pedal sensor 36 and acceleration pedal sensor 38 represent the angular position of each associated pedal with respect to a rest or "off" position thereof. The acceleration pedal and brake pedal are conventionally located in automotive vehicle 20 and are actuated by the driver of the vehicle, and a preferred embodiment of the brake pedal sensor 36 and acceleration pedal sensor 38 is described hereinafter with reference to FIGS. 10-12. The signal from speed sensor 40 represents the rotational speed of the vehicle. In the preferred embodiment of the invention, speed sensor 40 comprises a plurality of sensors, each of which is operatively associated with one of the motors $24_1-24_4$ and which provides a signal proportional to the rotational speed of its associated motor. The signals from the plurality of sensors are then averaged in microprocessor 32 to develop a signal related to the velocity of automotive vehicle 20.

During propulsion, microprocessor 32 provides appropriate signals to control circuit 30 so as to maintain the relationship $$ACC = P + S, \qquad (1)$$

where:
ACC = the angular position of the acceleration pedal (represented by the signal from acceleration pedal sensor 38);
P = the magnitude of electrical power transfer from electrical energy sources 28 to motors $24_114\ 24_4$ (represented by the signal from power sensor 34); and,
S = the velocity of automotive vehicle 20 (represented by the signal from speed sensor 40).

From relationship (1), it can be seen that when the vehicle is at rest, and the accelerator pedal is actuated by the driver to a position away from its rest position, microprocessor 32 will provide signals to control circuit 30 whereupon maximum power is transferred from electrical energy sources 28 to motors $24_1-24_4$. As the velocity of the vehicle thereafter increases, the power transferred to motors $24_1-24_4$ will be decreased until an equilibrium condition is reached. The maximum power that can be transferred to motors $24_1-24_4$ is determined by the particular combination of the main rechargeable batteries and the motors selected by microprocessor 32. Accordingly, each such combination represents a "gear" of the vehicle. Within each such gear, the actual power transferred to the motors $24_1-24_4$ is determined by control of the field current of each motor.

If the driver of the vehicle should change the angular position of the acceleration pedal, microprocessor 32 will vary the power transferred to motors $24_1-24_4$ so as to maintain relationship (1). Likewise, if the velocity of the vehicle should change after an equilibrium condition has been reached, e.g., the vehicle encounters an upgrade or a downgrade, microprocessor 32 will vary the power transfered to motors $24_1-24_4$ so as to maintain relationship (1). For cruise control, microprocessor 32 will vary the power transferred to motors $24_1-24_4$ so as to maintain velocity substantially constant.

Upon braking, microprocessor 32 seeks to maintain the following relationship:

$$BRK = -P. \qquad (2)$$

where:
BRK = the angular position of the brake pedal (represented by the signal from brake pedal sensor 36); and,
−P = the magnitude of electrical power transfer from motors $24_1$-$24_4$ (due to generator action) to electrical energy sources 28 (represented by the signal from power sensor 34).

From relationship (2), it can be appreciated that microprocessor 32 supplies signals to control circuit 30 so as to maintain the actual power transferred from motors $24_1$-$24_4$ to electrical energy sources 28 substantially equal to the angular position of the brake pedal. Since the amount of braking force developed by each motor is related to the amount of electrical energy generated thereby, the automotive vehicle is accordingly decelerated at a rate related to the angular position of the brake pedal. For emergency braking, braking to a full stop, and parking, a small disc brake is operatively associated with each motor and may be actuated by microprocessor 32 as described hereinafter, or, by a conventional mechanical linkage coupled to either the brake pedal or to a separate actuating arm accessible to the driver of the vehicle. As described hereinafter in conjunction with the preferred embodiment, microprocessor 32 causes each motor to undergo generator action by interrupting the commutation of the armature of the motor upon detection of movement of the brake pedal from its rest position.

Microprocessor 32 and its associated components may permit the driver to manually select any "gear" and any desired velocity for cruise control, and may display to the driver the vehicle's velocity, the actual power being transferred, the "gear", the charge condition of any of the main rechargeable batteries, and other information.

Figure 2A:
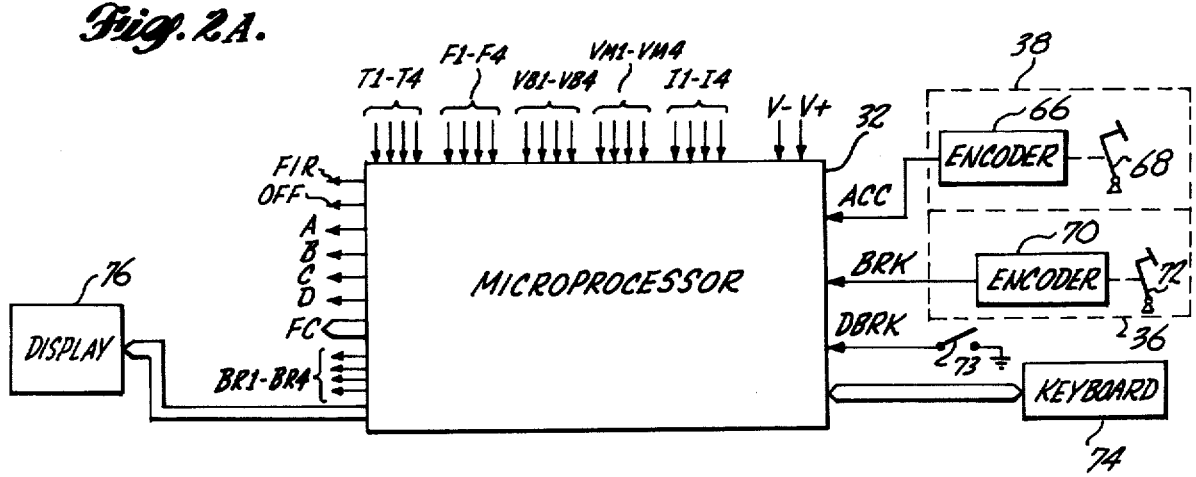
FIG. 2A is an electrical schematic and block diagram of a second portion of the preferred embodiment.

With reference now to FIGS. 2 and 2A, electrical energy sources 28 comprise main rechargeable batteries B1, B2, B3, B4, and an auxiliary rechargeable battery B5. Each of the main rechargeable batteries has associated therewith a current sensor IS and a voltage sensor VS respectively providing current and voltage signals (in digital or analog form) related to the current through and voltage across its associated main rechargeable battery (i.e., signals I1, VB1; I2, VB2; I3, VB3; I4, VB4 for, respectively, batteries B1; B2; B3; B4). The current and voltage signals are supplied to respective inputs of microprocessor 32. Each of the motors $24_1$-$24_4$ includes a commutation circuit COM, a three-phase armature winding AM, and a field winding FLD (i.e., COM1, AM1, and FLD1; COM2, AM2, and FLD2; COM3, AM3, and FLD3; COM4, AM4, and FLD4 for, respectively, motors $24_1$; $24_2$; $24_3$; $24_4$). Each commutation circuit COM receives an OFF signal and a F/R signal from microprocessor 32, and supplies to microprocessor 32 a frequency signal related to the frequency of rotation of its associated motor (i.e., signals F1; F2; F3; F4 for, respectively, motors $24_1$; $24_2$; $24_3$; $24_4$), and an armature voltage signal related to the voltage across the armature winding of its associated motor (i.e., signals VM1; VM2; VM3; VM4 for, respectively, motors $24_1$; $24_2$; $24_3$; $24_4$). Associated with each motor is a temperature sensor TS which provides a temperature signal related to the temperature of the motor's armature (i.e., signals T1; T2; T3; T4 for, respectively, motors $24_1$; $24_2$; $24_3$; $24_4$). The temperature signals are supplied to respective inputs of microprocessor 32. A disc brake DB is operatively associated with each motor and is adapted to exert a mechanical braking force on the shaft of its associated motor in response to a brake signal from microprocessor 32 (i.e., signals BR1; BR2; BR3; BR4 for, respectively, motors $24_1$; $24_2$; $24_3$; $24_4$).

Control of the battery voltage applied across the commutation circuit of each motor is accomplished by a first group of relays K1 and K2 and a second group of relays K3 and K4 and their associated relay contacts, all forming part of control circuit 30 (FIG. 1). The energization states of the relays are in turn controlled by appropriate output signals from microprocessor 32. Through the relay contacts of the first and second group of relays, the main rechargeable batteries B1-B4 and the commutation circuits COM1-COM4, respectively, may be interconnected with a positive main bus 50 and a negative bus 52 in selectable combinations, or may be disconnected from buses 50 and 52 when the vehicle is at rest. Each of the relays is interconnected with an associated relay driver RD, with the relay drivers for relays K1, K2, K3 and K4 respectively receiving signals A, B, C and D from microprocessor 32. Each of the signals A-D has three states, i.e., a low logic level state, a high logic level state, and a tri-state or floating state. The relay contacts associated with each relay K1-K4 include two or more movable contacts which are operable in unison to one of three positions, e.g., a disconnected or center position, a left hand position, and a right hand position. When one of the signals A-D from microprocessor 32 is at its tri-state, the corresponding relay driver RD causes the associated relay K1-K4 to be deenergized so that the movable contacts thereof are in their disconnected, center positions. When one of the signals A-D from microprocessor 32 is at its low logic level state, the corresponding relay driver RD energizes its associated relay K1-K4 so that the movable contacts thereof are in their right hand positions. When one of the signals A/D from microprocessor 32 is at its high logic level state, the corresponding relay driver RD energizes its associated relay K1-K4 so that the movable contacts thereof are in their left hand positions.

Relays K1 and K3 each comprise a four pole, three position relay and relays K2 and K4 each comprise a two pole, three position relay. Relay K1 has relay contact groups K1A and K1B, with the movable contacts in group K1A being connected, respectively, to the positive terminal of battery B1 and to the negative terminal of battery B2, and with the movable contacts in group K1B being connected, respectively, to the positive terminal of battery B3 and to the negative terminal of battery B4. Relay K3 has relay contact groups K3A and K3B, with the movable contacts in group K3A being connected, respectively, to the positive terminal of COM1 and to the negative terminal of COM2, and with the movable contacts in group K3B being connected, respectively, to the positive terminal of COM3 and to the negative terminal of COM4. Relay K2 has relay contact group K2A whose movable contacts are connected, respectively, to the positive terminal of battery B2 and to the negative terminal of battery B3. Relay K4 has relay contact group K4A whose movable contacts are connected, respectively, to the positive terminal of COM2 and to the negative terminal of COM3.

Each movable contact in each relay contact group has associated therewith a right and a left stationary contact so as to establish a contact set. The right stationary contact in one contact set in each relay group is connected to the right stationary contact in the other contact set in that group. The negative terminal of battery B1, the negative terminal of commutation circuit COM1, and one of the left stationary contacts in each relay group are each connected to the negative main bus 52. The positive terminal of battery B4, the positive terminal of commutation circuit COM4, and the remaining left stationary contacts in each relay group are connected to the positive main bus 50.

Those skilled in the art will appreciate that microprocessor 32, through control of the states of signals A-B, can connect the batteries B1-B4 all in series with each other across positive main bus 50 and negative main bus 52, all in parallel with each other across busses 50 and 52, or in various series/parallel combinations across busses 50 and 52. Likewise, microprocessor 32, through control of the states of signals C-D, can connect commutation circuits COM1-COM4 all in series with each other, all in parallel with each other, or in various series-parallel combinations across busses 50 and 52. Accordingly, a total of nine discrete power steps or "gears" may be chosen by microprocessor 32 and controlled through signals A-D. Of these nine power steps, four are equivalent in terms of battery voltage across each motor so that five power steps or "gears" are provided as following:

TABLE I

| Gear | Commutation Circuits | Batteries | Battery Voltage Across Each Motor |
|---|---|---|---|
| 1 (low) | all in series | all in parallel | $0.0624\ VM_{max}$ |
| 2 | series/parallel | all in parallel | $0.125\ VM_{max}$ |
| 3 | all in parallel | all in parallel | $0.25\ VM_{max}$ |
| 4 | all in parallel | series/parallel | $0.50\ VM_{max}$ |
| 5 (high) | all in parallel | all in series | $VM_{max}$ |

The voltage across the positive main bus 50 and the negative main bus 52 is supplied to respective inputs of a charging circuit 60 by a pair of leads 62, 64. Charging circuit 60 responsively provides current for recharging auxiliary battery B5 by a lead 60A connected to the negative terminal of battery B5 and a lead 60B coupled to the positive terminal of battery B2.

In order to provide field current control, a positive auxiliary bus 54 is coupled to the positive terminal of auxiliary battery B5 through an ON/OFF switch 61 and a negative auxiliary bus 56 is coupled to the negative terminal of auxiliary battery B5 through a resistor 139. The voltage across battery B5 (V+, V−), as coupled through switch 61, is applied to respective inputs of microprocessor 32, and to the remaining components of the apparatus by means not illustrated, to provide a power supply therefor. Field windings FLD1-FLD4 are connected in a series circuit along with diodes 130, 131 and 132 across positive and negative auxiliary busses 54, 56. Specifically, the positively-poled terminal of field winding FLD4 is connected to positive auxiliary bus 54, diode 132 provides a unidirectional conducting path from the negatively-poled terminal of field winding FLD4 to the positively-poled terminal of field winding FLD3, diode 131 provide a unidirectional conducting path from the negatively-poled terminal of field winding FLD3 to the positively-poled terminal of field winding FLD2, diode 130 provides unidirectional conducting path from the negatively-poled terminal of field winding FLD2 to the positively-poled terminal of field winding FLD1, and, the negatively-poled terminal of field winding FLD1 is connected to the negative auxiliary bus 56. A plurality of switching transistors 133, 134, 135, 136, 137 and 138 are provided to selectively connect field windings FLD1-FLD4 all in series with each other across positive auxiliary bus 54 and negative auxiliary bus 56, all in parallel with each other across busses 54 and 56, or in a series/parallel combination across busses 54 and 56. Specifically, the collectors of transistors 133, 134, 135, 136, 137 and 138 are connected, respectively, to the common junction of field winding FLD1 and diode 130, to the common junction of diode 130 and field winding FLD2, to the common junction of field winding FLD2 and diode 131, to the common junction of diode 131 and field winding FLD3, to the common junction of field winding FLD3 and diode 132, and to the common junction of diode 132 and field winding FLD4. The emitters of transistors 133, 135 and 137 (which are PNP type) are connected to positive auxiliary bus 54, and the emitters of transistors 134, 136 and 138 (which are NPN type) are connected to negative auxiliary bus 56. The bases of transistors 133, 134, 135, 136, 137 and 138 receive, respectively, signals F, F', E, E', F, and F' described hereinafter.

Microprocessor 32 provides a signal FC which represents, in digital form, the desired field current in each field winding FLD1-FLD4. Signal FC is converted into a corresponding analog voltage by a digital-to-analog converter 141, and the analog voltage is coupled to the inverting input of a comparator 143 by a resistor 142. A resistor 140 couples the inverting input of comparator 143 to ground (e.g., to the negative terminal of auxiliary battery B5). Resistors 140 and 142 act as a voltage divider so that the voltage presented to the inverting input of comparator 143 (representing desired field current) varies in a predetermined range (e.g., 0.01 volt to 0.1 volt). The negative auxiliary bus 56 is connected to the noninverting input of comparator 143 by a lead 56' going to the common junction of negative auxiliary bus 56 and resistor 139. The value of resistor 139 is chosen so that the voltage presented to the noninverting input of comparator 143 (representing actual field current) varies in the same predetermined range as the voltage presented to the inverting input of comparator 143 (e.g., 0.01 volt to 0.1 volt). The signal on the output 143A of comparator 143 has either a positive logic level or a negative logic level, depending on whether the voltage presented to its non-inverting input exceeds or is less than the voltage presented to its inverting input. A feedback circuit 151 is connected from the output of comparator 143 to the inverting input thereof and functions to apply a feedback voltage to the inverting input of comparator 143 that has the same polarity as the signal on output 143A and whose magnitude gradually increases over time in a predetermined range (e.g., 0.01 volt to 0.1 volt) following each logic level change in the signal on output 143A. The net effect of feedback circuit 151, as described in more detail hereinafter, is to cause the signal on output 143A to have continuously alternating logic-level changes at a rate determined by the difference between actual field current and desired field current and the delay afforded by feedback circuit 151.

The signal on output 143A of comparator 143 and the signal FC from microprocessor 32 are applied to respective inputs of a logic circuit 144. A first output 144A of logic circuit 144 is connected to the input of an amplifier 145 and to the input of an inverting amplifier 146, and a second output 144B of logic circuit 144 is connected to the input of an amplifier 147 and to the input of an inverting amplifier 148. Signals E, E', F and F' appear, respectively, on the outputs of amplifier 145, inverting amplifier 146, amplifier 147 and inverting amplifier 148.

Logic circuit 144 performs two functions: first, to establish a desired field current range in accordance with the desired field current represented by signal FC by selectively connecting field windings FLD1-FLD4 all in parallel, in series/parallel, or all in series; and, second, to vary the actual field current within the desired field current range by "chopping" the field current in synchronism with the logic level changes in the signal on output 143A of comparator 143. The operations of logic circuit 144 are summarized in the following table:

TABLE II

| Field Current Range | Field Current | Field Windings | Logic Circuit Outputs | |
|---|---|---|---|---|
| FCR1 | $0.50FC_{max} > FC \geq FC_{max}$ | all in parallel | 144A<br>144B | high (duty-cycled) |
| FCR2 | $0.25FC_{max} > FC \geq 0.50FC_{max}$ | series/parallel | 144A<br>144B | high (duty-cycled)<br>low |
| FCR2 | $FC = 0.25FC_{max}$ | all in series | 144A<br>144B | low |

It should be noted that each of the motors $24_1$-$24_4$ is of identical construction, so that the impedances of field windings FLD1-FLD4 are substantially equal. It will also be noted that the voltage impressed across positive and negative auxiliary busses 54, 56 by auxiliary battery B5 is substantially constant (neglecting the relatively small current-varying voltage drop across resistor 139). Therefore, when field windings FLD1-FLD4 are connected all in parallel across busses 54, 56, the impedance presented to busses 54, 56 by field windings FLD1-FLD4 is at a minimum and maximum field current ($FC_{max}$) flows through each field winding FLD1-FLD4. When field windings FLD1-FLD4 are connected in series/parallel across busses 54, 56 the effective impedance presented to busses 54, 56 by field windings FLD1-FLD4 doubles so that the field current flowing in each field winding FLD1-FLD4 is substantially 0.50 $FC_{max}$. When field windings FLD1-FLD4 are connected all in series across busses 54, 56, the effective impedance presented to busses 54, 56 again doubles so that the field current flowing in each field winding FLD1-FLD4 substantially equals 0.25 $FC_{max}$.

Considering now Table II in conjunction with FIG. 2, let it be assumed that the signal FC represents a maximum desired field current (FC=$FC_{max}$ in range FCR1). As a result, signals and outputs 144A, 144B each have a high logic level, whereupon signals E, F have a high logic level and signals E', F' have a low logic level. Accordingly, each of transistors 133-138 is turned on, back-biasing diodes 130, 131 and 132, so that field windings FLD1-FLD4 are connected all in parallel across busses 54, 56. Let it now be assumed that the desired field current is one-half the maximum field current (FC=0.50 $FC_{max}$ in range FCR2). The signal on output 144A has a high logic level, and the signal on output 144B has a low logic level. As a result, signals E and F' have a high logic level and signals E' and F have a low logic level, whereupon transistors 135 and 136 are turned on, back-biasing diode 131, and transistors 133, 134, and 137, 138 are turned off, respectively, forward-biasing diodes 130, 132. Accordingly, field windings FLD1 and FLD2 are connected in series across busses 54, 56, and field windings FLD3 and FLD4 are connected in series across busses 54, 56. Let it now be assumed that the desired field current is one-quarter the maximum field current (FC=0.25 $FC_{max}$ in range FCR3). The signals on outputs 144A, 144B each have a low logic level, whereupon transistors 133-138 are all turned off and diodes 130-132 are all forward-biased. Accordingly, field windings FLD1-FLD4 are connected all in series across busses 54, 56.

Let it now be assumed that the desired field current is within range FCR1, e.g., FC=0.75 $FC_{max}$. In this situation, the signal on outputs 144A, 144B will be duty-cycled, e.g., switched from a high logic level to a low logic level, in synchronism with the signal appearing on output 143A of comparator 143. Accordingly, the conduction times of the appropriate transistors (in this situation, transistors 133-138) will also be duty-cycled. As a result, the actual field current in field windings FLD1-FLD4 is chopped so that the average actual field current is substantially equal to the desired field current. In range FCR2, the actual field current is set substantially equal to the desired field current in a similar manner by duty-cycling the signal on output 144A and accordingly duty-cycling the conduction times of the appropriate transistors (in this case, transistor 135 and 136). In range FCR3, all transistors are turned off, so that the actual field current is limited to 0.25 $FC_{max}$.

The chopping operation described above may be better understood by consideration of the following circumstances. If it is assumed that actual field current (represented by the voltage presented to the noninverting input of comparator 143) is less than desired field current (represented by the voltage presented to the inverting input of comparator 143), then the signal on output 143A will have a negative logic level that turns off the transistors selected by logic circuit 144. As a result, actual field current increases. In addition, due to the negative feedback voltage from feedback circuit 151, desired field current decreases at a predetermined rate. At some point, the voltage presented to the noninverting input of comparator 143 exceeds the voltage presented to the inverting input of comparator 143, whereupon the signal on output 143A changes to a positive logic level. Accordingly, the transistors selected by logic circuit 144 are turned on. Thereafter, actual field current decreases and desired field current increases (due to the now positive feedback voltage from feedback circuit 151) until the voltage on the inverting input of comparator 143 again exceeds the voltage on the noninverting input thereof, whereupon the cycle is repeated. The average actual field current is therefore maintained substantially equal to the desired field current, with averaging being accomplished by the inductance of field windings FLD1-FLD4.

In the preferred embodiment, the acceleration pedal sensor 38 (FIG. 2A) comprises an encoder 66 which provides a signal ACC, preferably in digital form, which is related to the angular position of an accelerator pedal 68 from a rest position. The rest position is established by an appropriate mechanical stop, and accelerator pedal 68 is spring-biased to its rest position. Likewise, the brake pedal sensor 36 (FIG. 2A) comprises an encoder 70 which provides a signal BRK, preferably in digital form, which is related to the angular position of a brake pedal 72 from a rest position. Again, the rest position is established by a mechanical stop, and brake pedal 72 is spring-biased to its rest position. Signals ACC and BRK are each supplied to respective inputs of microprocessor 32.

A switch 73 is operatively associated with the operator-actuable mechanical linkage connected to disc brakes DB. If the disc brakes are being actuated through this mechanical linkage, switch 73 is closed to supply a signal DBRK to microprocessor 32.

Microprocessor 32 is interconnected with a keyboard 74 which includes a plurality of manually-actuable keys accessible to the driver and which can be used to enter certain commands into microprocessor 32, e.g., on/off, forward/reverse, selection of any power step or "gear", a desired velocity for cruise control, etc. Microprocessor 32 is also interconnected with a display 76, which preferably includes a plurality of alphanumeric character display units and which is controlled by microprocessor 32 so as to display certain information relating to the operation of the vehicle, e.g., vehicle velocity, the amount of power transfer, the "gear", the main battery charge condition, etc.

Figure 5:
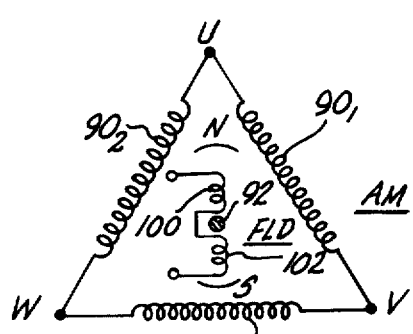
FIG. 5 is an electrical schematic diagram of the electrical motor.

With reference now to FIGS. 3, 4 and 5, the preferred embodiment of each electrical motor includes a housing 80 having end plates 82, 84. A stator 86 of magnetically-permeable material is affixed to the interior of housing 80 and has formed therein a plurality of spaced-apart, longitudinally-extending slots in which are located the turns 88 of a multiphase armature winding. Preferably, the armature winding has three phases $90_1$, $90_2$ and $90_3$ connected in delta, with the points of the delta being respectively labeled U, V and W. As explained hereinafter in conjunction with FIGS. 8 and 9, points U, V and W are connected to corresponding points of the associated commutation, circuit COM.

A shaft 92 is supported for rotation from end plates 82, 84 by bearings 94, 96 and includes a reduced-diameter portion 92A that projects beyond end plate 82. A rotor 97 of magnetically-permeable material includes a core 98 rigidly attached to the portion of shaft 92 within housing 80 and having wound thereon a field winding FLD having first and second winding portions 100, 102 connected in series and disposed on opposite sides of shaft 92. First and second pole pieces 104, 106 are respectively attached to opposite ends of core 98, with each of the pole pieces having an arcuate outer surface which faces stator 86 in assembly so as to define an air gap therebetween.

The ends of field winding FLD are brought out through a hollowed-out portion of shaft 92 and terminate in respective first and second sliprings 108, 110 secured to shaft portion 92A. Brushes 112, 114 are mounted within a housing 116 affixed to end plate 82 and respectively engage sliprings 108, 110, with appropriate electrical connections being made to brushes 112, 114 to couple the field winding FLD to the appropriate portion of control circuit 30 (e.g., diodes 130, 131, 132, transistors 133-138, and busses 54, 56, FIG. 2).

Shaft portion 92A also has affixed thereto a sensor disc 118 (FIG. 6) which has associated therewith a plurality of spaced-apart sensors 120 mounted within housing 116. Each of the sensors 120 is electrically connected to the corresponding commutation circuit COM as described hereinafter with reference to FIGS. 8 and 9. A disc brake DB includes a disc 122 secured to shaft portion 92A beyond housing 116, a brake pad 124 adapted to engage disc 122, and an actuator 126 responsive to a brake signal from microprocess 32 (brake signals BR1-BR4, FIG. 2) for engaging brake pad 124 with disc 122.

It will be appreciated that the construction of rotor 97 provides a two-pole field. As a result, application of a dc voltage across the terminals of the field winding FLD results in the production of a substantially sinusoidal magnetic field around the air gap defined between pole pieces 104, 106 and stator 86. As shaft 92 rotates, the magnetic field produced by field winding FLD likewise rotates so that the field intensity at any point along the air gap varies in a substantially sinusoidal manner. In order to produce motor action, the signals obtained from sensors 120 are used to commutate the dc battery voltage applied to the phases $90_1$, $90_2$ and $90_3$ of armature winding AM so that the armature winding likewise produces a magnetic field which rotates at the speed of the magnetic field produced by field winding FLD. Because of mechanical forces exerted on rotor 97, the two magnetic fields cannot be completely aligned, whereby electrical-to-mechanical energy conversion takes place.

To obtain generator action, commutation of armature winding AM is interrupted and the points U, V and W thereof are connected through appropriate rectifiers to the source of dc voltage applied thereto. As a result, mechanical-to-electrical energy conversion takes place, with electrical energy being coupled back to the source and with a countertorque being exerted on the rotor which opposes the external mechanical forces acting thereon, e.g., those produced as a result of rotation of the associated wheel, so that braking is accomplished.

The armature winding AM may be of conventional three phase alternating current design, but should be capable of operating at frequencies commensurate with the maximum rotational speed of the motor (e.g., for a maximum rotational speed of 15,000 rpm, a frequency of 250 Hz). Although the rotor 97 has been described as including a salient pole construction (e.g., that afforded by pole pieces 104, 106), it is also contemplated that a stamped laminate rotor with distributed windings can be used.

Saft 92 also has a reduced-diameter portion 92B which extends past end plate 84 in assembly. As described hereinafter in conjunction with FIG. 17, a gear forming part of the gear train that couples each motor to its associated wheel is fitted on reduced-diameter portion 92B.

Figure 6:
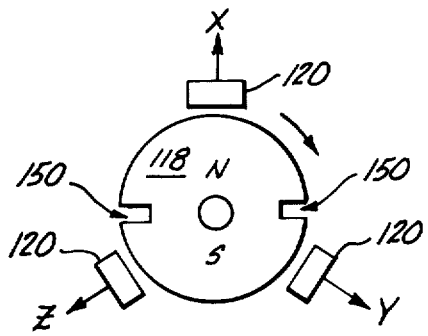
FIG. 6 is an end view of the shaft position sensor of FIG. 3.
Figure 7:
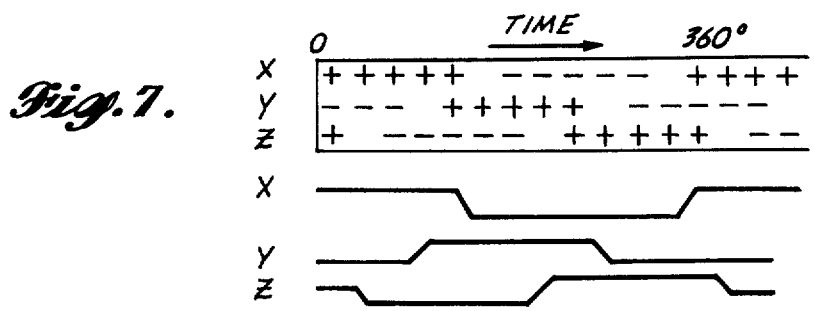
FIG. 7 is a timing diagram illustrating output signals from the shaft position sensor.
Figure 8:
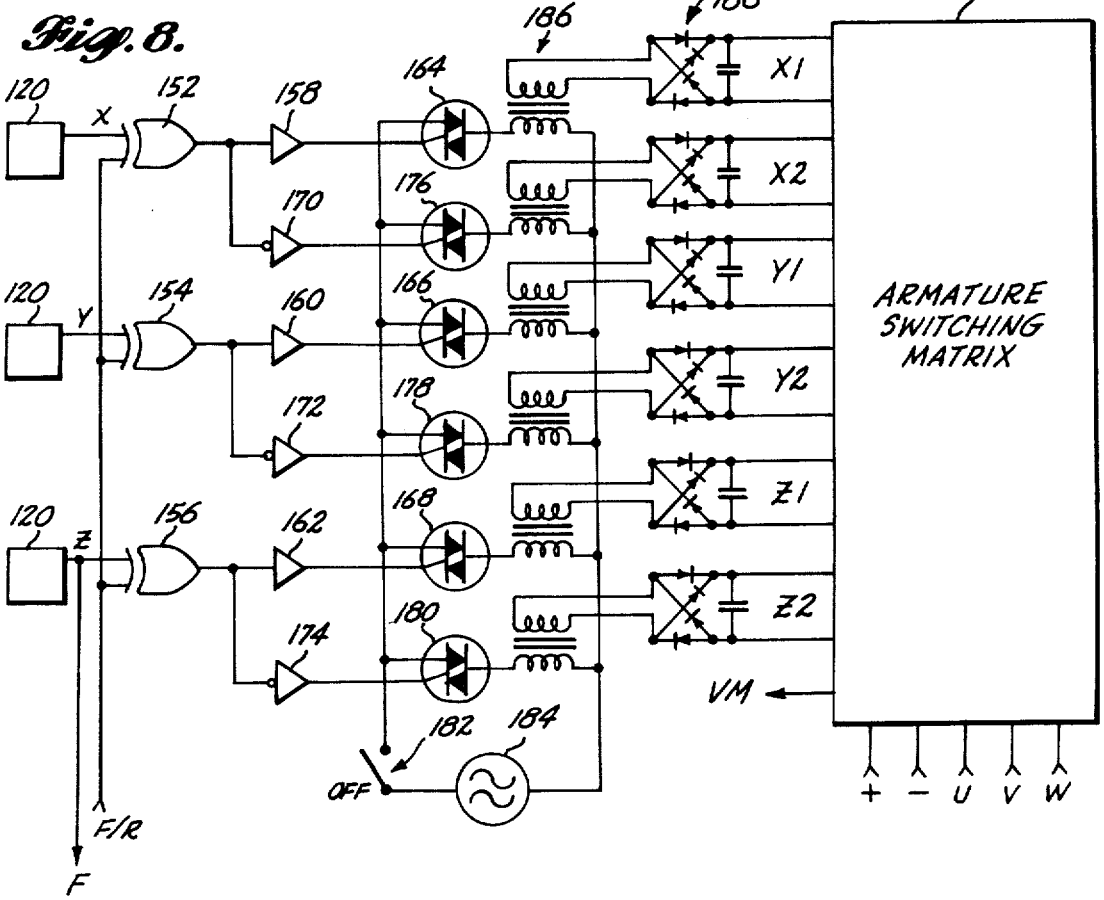
FIG. 8 is an electrical schematic and block diagram of a commutation circuit for controlling commutation of the electrical motor in accordance with output signals from the shaft position sensor.

With reference now to FIGS. 3 and 6, disc 118 is permanently-magnetized and accordingly has north (N) and south (S) poles defined by a pair of notches 150 diametrically opposite each other and extending into disc 118 from its periphery. Each of the sensors 120 preferably comprises a Hall-effect sensor adapted to provide an output signal related to the polarity and strength of the magnetic field produced by disc 118. Sensors 120 are spaced about the periphery of disc 118 at 120° intervals and respectively provide output signals denominated X, Y and Z. Referring now to FIG. 7, each of the signals X, Y and Z undergoes a substantially sinusoidal variation for each complete revolution of shaft 92, with each signal being spaced in time from the signals produced by its adjacent sensors by 120°. The signals X, Y and Z are used to effect commutation of the three phases $90_1$, $90_2$ and $90_3$ of armature winding AM (FIG. 5) and are supplied to the associated commutation circuit COM as illustrated in FIG. 8.

Within the commutation circuit COM, signals X, Y and Z are applied, respectively, to first inputs of exclusive-OR gates 152, 154 and 156. The second inputs of exclusive-OR gates 152, 154 and 156 receive the F/R signal from microprocessor 32. The outputs of exclusive-OR gates 152, 154 and 156 are coupled through respective buffer amplifiers 158, 160 and 162 to the gates of respective triacs 164, 166 and 168. The outputs of exclusive-OR gates 152, 154 and 156 are also connected through respective inverting amplifiers 170, 172 and 174 to the gates of respective triacs 176, 178 and 180. One main current-carrying terminal of each of triacs 164, 166, 168, 176, 178 and 180 is connected through a semiconductor switch 182 (which is responsive to the OFF signal from microprocessor 32) to one side of a high frequency signal source 184, and the other main-current carrying terminal of triacs 164, 166, 168, 176, 178 and 180 is coupled to the other side of signal source 184 through the primary winding of an associated one of a plurality of transformers 186. The secondary winding of each transformer 186 is coupled through an associated full-wave bridge and filter circuit 188 to corresponding inputs of an armature switching matrix 190 (FIG. 9) to which is also connected the positive (+) and negative (−) terminals of the commutation circuit COM and points U, V and W of the armature winding AM.

When the F/R signal from microprocessor 32 has a first logic level, representing a desired forward propulsion direction of the automotive vehicle, triacs 164, 166 and 168 are enabled for conduction in succession as the signals X, Y and Z successively have positive logic levels. Likewise, when the F/R signal from microprocessor 32 has a second logic level, representing a desired reverse propulsion direction of the automotive vehicle, triacs 176, 178 and 180 are enabled for conduction in succession as the signals X, Y and Z successively have negative logic levels. If semiconductor switch 182 has been actuated, e.g., an OFF signal is not being provided by microprocessor 32, each of the triacs is caused to conduct by the application thereto of the signal from high frequency signal source 184. During the time that each triac is conducting, a corresponding signal (signals X1, X2, Y1, Y2, Z1 and Z2 for triacs 164, 176, 166, 178, 168 and 180) is provided by the associated transformer 186 and rectifier and filter circuit 188 to corresponding inputs of armature switching matrix 190.

Figure 9:
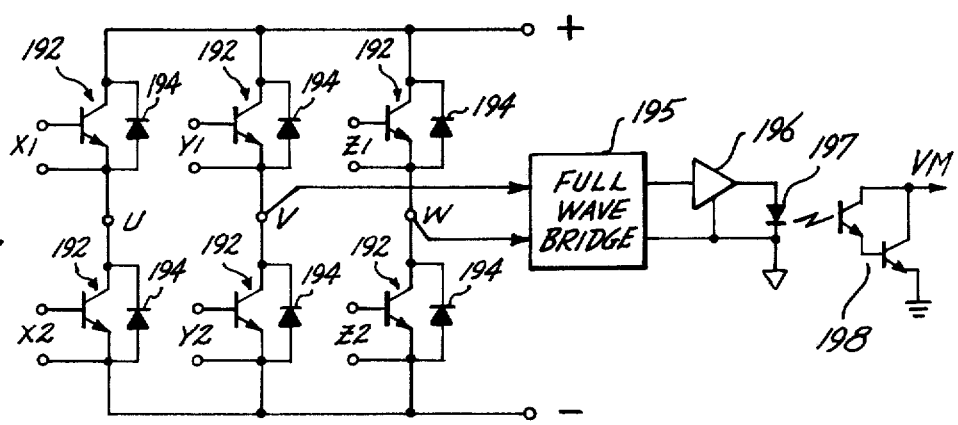
FIG. 9 is an electrical schematic diagram of an armature switching matrix of FIG. 8.

With reference now to FIG. 9, armature switching matrix 190 includes a plurality of power transistors 192. The power transistors 192 that receive signals X1, Y1 and Z1 are adapted to connect, respectively, the U, V and W points of armature winding AM to the positive (+) terminal of the commutation circuit COM, and therefore to the positive main bus 50 as previously described in conjunction with FIG. 2. The power transistors 192 that receive signals X2, Y2 and Z2 are adapted to connect, respectively, the points U, V and W to the negative (−) terminal of commutation circuit COM, and thus to the negative main bus 52 as previously described in conjunction with FIG. 2. A diode 194 is connected in reverse-parallel with each power transistor 192.

As can be appreciated, signals X1, Y1 and Z1 are provided to armature switching matrix 190 in synchronism with the corresponding positive amplitudes of signals X, Y and Z (FIG. 7) so as to connect points U, V and W in succession to the positive potential on positive main bus 50. As a result, the three phases $90_1$, $90_2$ and $90_3$ of armature winding AM are energized in succession so as to produce a continuously rotating armature field of a given polarity whose rotation is substantially synchronized with the rotation of shaft 92 (and thus with the field produced by field winding FLD). Likewise, signals X2, Y2 and Z2 are provided in succession to armature switching matrix 190 when signals X, Y and Z have a negative amplitude. As a result, points U, V and W are connected to the negative potential on negative main bus 52 so as to cause current flow through the phases $90_1$, $90_2$ and $90_3$ of the armature winding AM in a direction opposite to that produced by the successive provision of signals X1, Y1 and Z1. As a result, the armature field produced by armature winding AM continuously rotates in an opposite direction in substantial synchronism with rotation of output shaft 92 (and thus with the field produced by field winding FLD). The reaction between the fields produced by armature AM and field winding FLD therefore results in rotation of shaft 92 in either a forward or a reverse direction.

When an OFF signal is provided by microprocessor 32, semiconductor switch 182 is deenergized, whereupon triacs 164, 176, 166, 178, 168 and 180 are placed in a nonconducting condition and commutation is terminated. Since there is no field being produced by the armature winding AM, the rotating field being produced by field winding FLD results in a voltage being induced or generated in the armature winding AM which appears across points U, V and W. When the potential at any of the points U, V or W exceeds the potential of the positive main bus 50, those diodes 194 connected in reverse-parallel with those ones of power transistors 192 respectively responsive to signals X1, Y1 and Z1 conduct to supply the armature current to the batteries B1-B4. Likewise, when the potential at any of the points U, V or W is less than the potential on the negative main bus 52, those diodes 194 connected in reverse-parallel with those ones of power transistors 194 respectively responsive to signals X2, Y2 and Z2 conduct to supply the armature current to batteries B1-B4. Whenever armature circuit is being supplied to batteries B1-B4, a countertorque is exerted on shaft 92 so as to result in a braking force being applied to the associated wheel. Control of braking is afforded by controlling the battery voltage across the positive (+) and negative (−) terminals of commutation circuit COM and the field current in the field winding FLD of the corresponding motor.

As described hereinafter, the field current is controlled so as to bring the voltage across the armature winding AM substantially equal to the battery voltage across the associated commutation circuit COM at certain times, e.g., when the battery voltage is changed at a "gear" change. To sense the armature voltage, points V and W are connected to corresponding inputs of a full wave bridge 195 whose rectified output is applied through an amplifier 196 across a light-emitting diode 197 forming part of an optical isolator. Full wave bridge 195, amplifier 196 and light emitting diode 197 are referenced to a potential which is isolated from the reference potential for microprocessor 32 and the remainder of the system in FIG. 2 (e.g., that appearing on the negative terminal of auxiliary rechargeable battery B5). The light emitted by light emitting diode 197 is detected by a Darlington pair 198 including a photosensitive transistor also forming part of the optical isolator. Darlington pair 198 is referenced to the reference potential of microprocessor 32 and provides an armature voltage signal VM whose average value is proportional to the voltage across armature winding AM. With reference back to FIG. 2, an armature voltage signal is obtained for each motor (signals VM1; VM2; VM3; VM4) and supplied to respective inputs of microprocessor 32 as illustrated in FIG. 2A.

Figure 10:
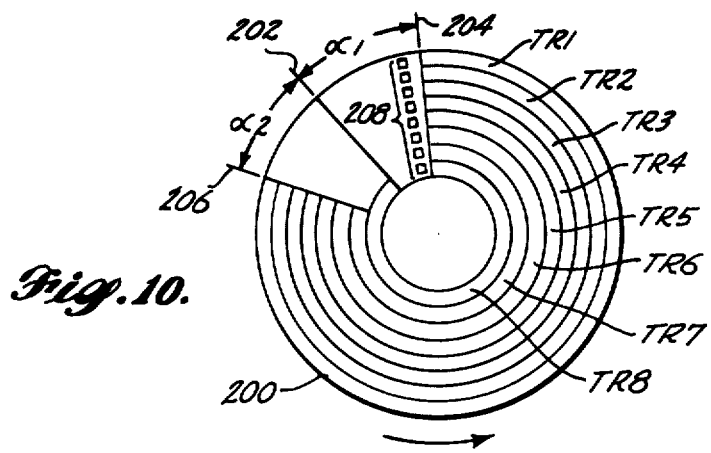
FIG. 10 is a plan view of a pedal encoder of FIG. 2.

The embodiment of commutation circuit COM seen in FIGS. 9 and 10 provides very efficient commutation. The voltage drop across each power transistor 192 is in the range of 0.5 to 1.0 volt. For a 20 horsepower electrical motor that is supplied at 100 volts, the current carrying capacity of each power transistor 194 should be about 150 amps. Such power transistors are commercially available and typically require a base drive current of about 10 amps to drive the power transistor to full saturation. When in full saturation, the base-emitter voltage drop of the power transistor is about 1 to 1.5 volts, so that the maximum power required to drive the transistor to saturation is about 15 watts. Since only three of the power transistors 192 are conducting at any given point in time, the total power required from high frequency signal source 184 is about 50 watts. Preferably, high frequency signal source 184 is energized from the auxiliary rechargeable battery B5 and has a frequency substantially greater than the maximum frequency of the signals X, Y and Z from sensors 120 (e.g., for a maximum frequency of 250 Hz of signals X, Y and Z, the frequency of high frequency signal source 184 may be 50 kHz) in order to permit efficient power transfer.

As also illustrated in FIG. 8, the signal from one of the sensors 120 (e.g., signal Z) is supplied to microprocessor 32 as a speed signal F, since the frequency thereof is proportional to the speed of rotation of shaft 92. As illustrated in FIG. 2, a speed signal is obtained from each of the motors (signals F1; F2; F3; F4) and supplied to corresponding inputs of microprocessor 32 as illustrated in FIG. 2A.

Figure 11:
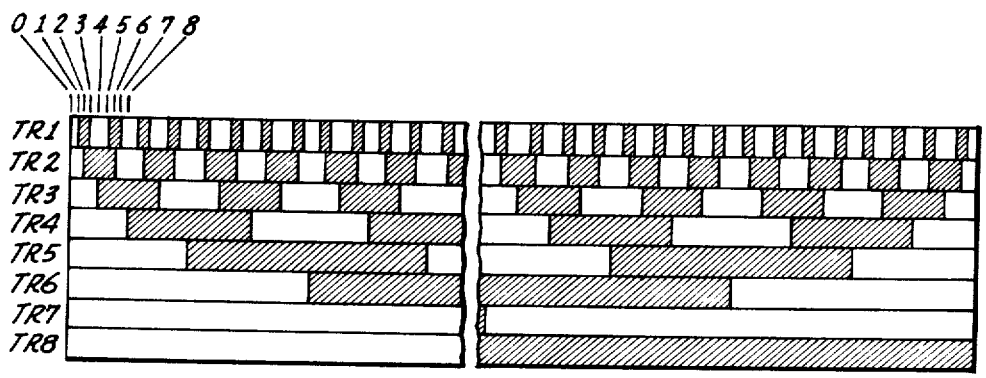
FIG. 11 is a developed view of an encoder disc of the pedal encoder.
Figure 12:
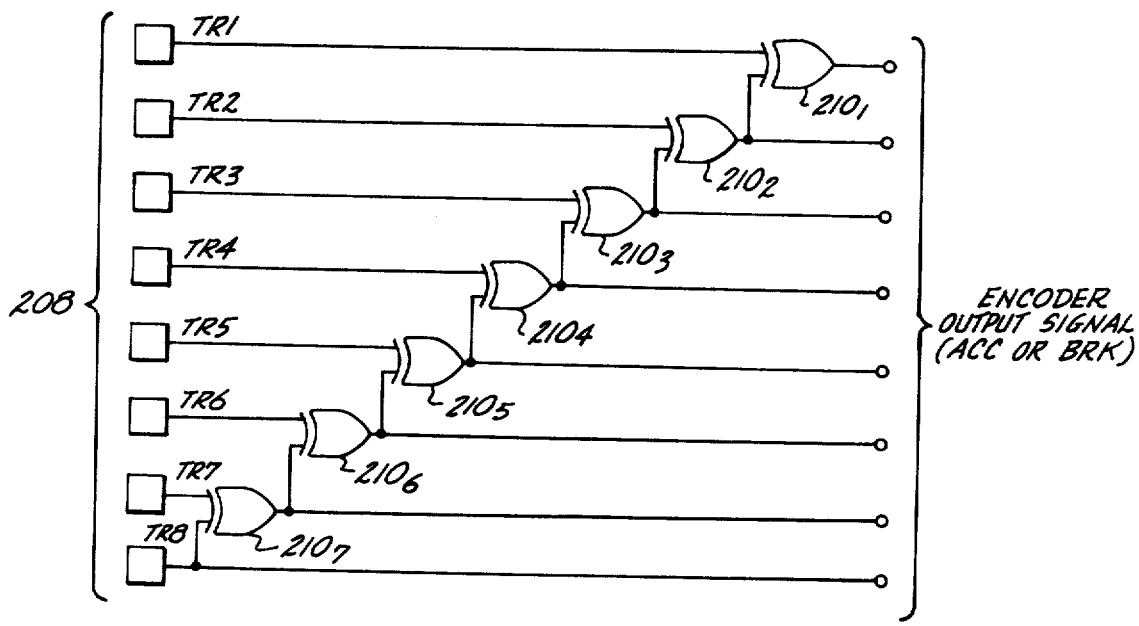
FIG. 12 is an electrical block diagram of the pedal encoder.

A preferred embodiment of each of the encoders 66, 70 is illustrated in FIGS. 10-12. Each encoder includes a substantially-planar, code disc 200 which is coupled with its associated pedal (68 or 72) by an appropriate gear mechanism, not illustrated, so that each code disc 200 is rotatable through substantially 300° for movement of its associated pedal from its rest position to its fully-actuated position. Code disc 200 has printed or otherwise formed thereon a plurality of annular tracks TR1-TR8, each track including a predetermined succession of "dark" bars and "light" spaces. Tracks TR1-TR8 are shown in linear, developed form in FIG. 12 and are seen to represent the commonly-known "gray" code, in which track TR1 has the greatest number of bars and spaces and therefore represents the least significant bit of the code and with track TR8 having the least number of bars and spaces and therefore representing the most significant bit of the code. As best seen in FIG. 10, code disc 200 has a first sector which extends from a reference radius 202 to a "start" radius 204 over an angle $\alpha_1$, with the first sector being substantially "light", and a second sector which extends from reference radius 202 to a "end" radius 206 over an angle $\alpha_2$, with the second sector including only track TR8 and being otherwise "light". Aligned with each one of tracks TR1-TR8 is one of a plurality of optical sensors 208 whose position is fixed with respect to rotation of code disc 200. When the associated pedal is in its rest position (and maintained thereat by a spring bias as previously described), the relative position of code disc 200 and sensors 208 is as illustrated in FIG. 10. Accordingly, each sensor 208 provides a high logic level output signal. As the pedal is actuated and code disc 200 is rotated past sensors 208, the output signals from sensors 208 undergo logic level changes dependent upon the code pattern in tracks TR1-TR8. The code pattern is such that there is never more than one logic level change, or, bit change, in the output signals from sensors 208 upon each increment of rotation of code disc 200. For example, it will be seen from FIG. 11 that as "start" radius 204 is rotated past sensors 208, the logic level of the output signal of the sensor 208 responsive to track TR1 changes, then the logic level of the sensor 208 responsive to track TR2 changes, then the logic level of the sensor 208 responsive to track TR1 changes, then the logic level of the sensor 208 responsive to track TR3 changes, and so forth. The advantage of using this code pattern for encoding the angular position of either the acceleration pedal or brake pedal is that there is never a jump in the output signal from the associated encoder that will cause microprocessor 32 to discontinuously vary the amount of propulsion or braking of the vehicle. Preferably, the information that is encoded ranges from "0" at the "start" radius 204 to "255" at the "end" radius 206.

The information represented by the output signals from sensors 208 may be converted into an eight-bit binary word by the logic circuit illustrated in FIG. 12. The output signals from those sensors 208 responsive to tracks TR1-TR7 are connected, respectively, to first inputs of a plurality of exclusive-OR gates $210_1$-$210_7$. The outputs of gates $210_2$-$210_7$ are connected to second inputs of exclusive-OR gates $210_1$-$210_6$, respectively, and the output signal from sensor 208 responsive to track TR8 is connected to the second input of exclusive-OR gate $210_7$. The encoder output signal (ACC or BRK) comprises the output signals from exclusive-OR gates $210_1$-$210_7$ and the output signal from sensor 208 responsive to track TR8. By this arrangement, a high logic level in the output signal from a first one of sensors 208 responsive to a predetermined track (e.g., TR2) changes the logic level in the output signal of the exclusive-OR gate receiving an output signal from a second one of sensors 208 responsive to the next least-significant track (e.g., TR1), whereas a low-logic level in the output signal from the first one of sensors 208 effect no change. Accordingly, the encoder output signal is an eight-bit binary representation of the angular position of the pedal and ranges from binary 0 to binary 255.

The first and second sectors defined, respectively, by radii 202 and 204, and by radii 202 and 206, provide a deadband to compensate for mechanical hysteresis in the associated pedal and gear mechanisms. If these sectors were not provided, a slight shift in the rest position of the pedal would cause either full propulsion or braking (e.g., by clockwise rotation of code disc 200) or the initial application of propulsion or braking (e.g., by counterclockwise rotation of code disc 200). Preferably, the angles $\alpha_1$ and $\alpha_2$ included in each sector are each 30°.

Figure 13:
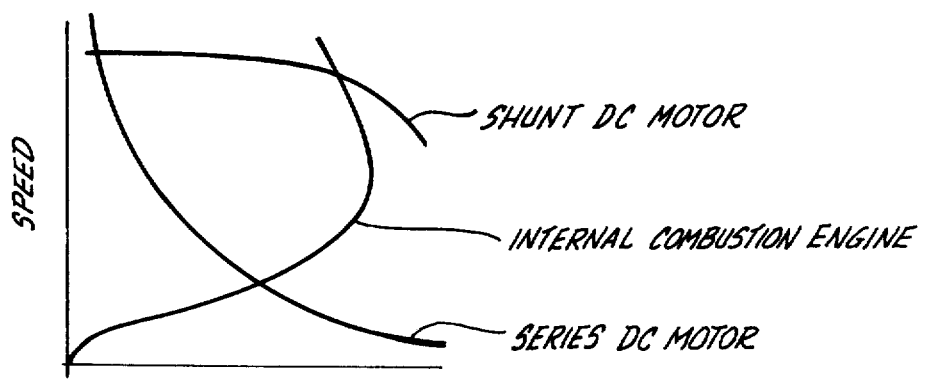
FIG. 13 is a graph illustrating the relationship between torque and speed for various types of prime movers.

As previously described, the maximum amount of electrical-to-mechanical conversion and of mechanical-to-electrical conversion that takes place during motor action and generator action, or "gear", is determined by control of the battery voltage impressed across each motor through signals obtained from microprocessor 32. Within each "gear", control of the field current by means of signals from microprocessor 32 permits variation of the torque-producing and of the electrical energy-producing characteristics of the motor during motor action and generator action. With reference now to FIG. 13, the speed-versus-torque characteristics of a conventional shunt dc motor, an internal combustion engine, and a conventional series dc motor are illustrated. The conventional shunt dc motor (that in which the field winding is in parallel with the armature winding) has a substantially constant speed-versus-torque characteristic. On the other hand, the conventional series dc motor (that having its field winding in series with its armature winding) has a speed-versus-torque characteristic in which torque drops rapidly as speed increases. The internal combustion engine has a speed-versus-torque characteristic in which torque rises with speed, and reaches a limiting value, and then begins to decrease with further increases in speed. In the conventional series dc motor, the field current varies with armature current, whereas in the conventional shunt dc motor, the field current is substantially constant, so as to result in the difference in the speed-versus-torque characteristics thereof. In the present invention, the magnitude of the field current of the motor can be controlled independently of the armature current thereof so as to obtain any desired speed-versus-torque characteristic.

Figure 14B:
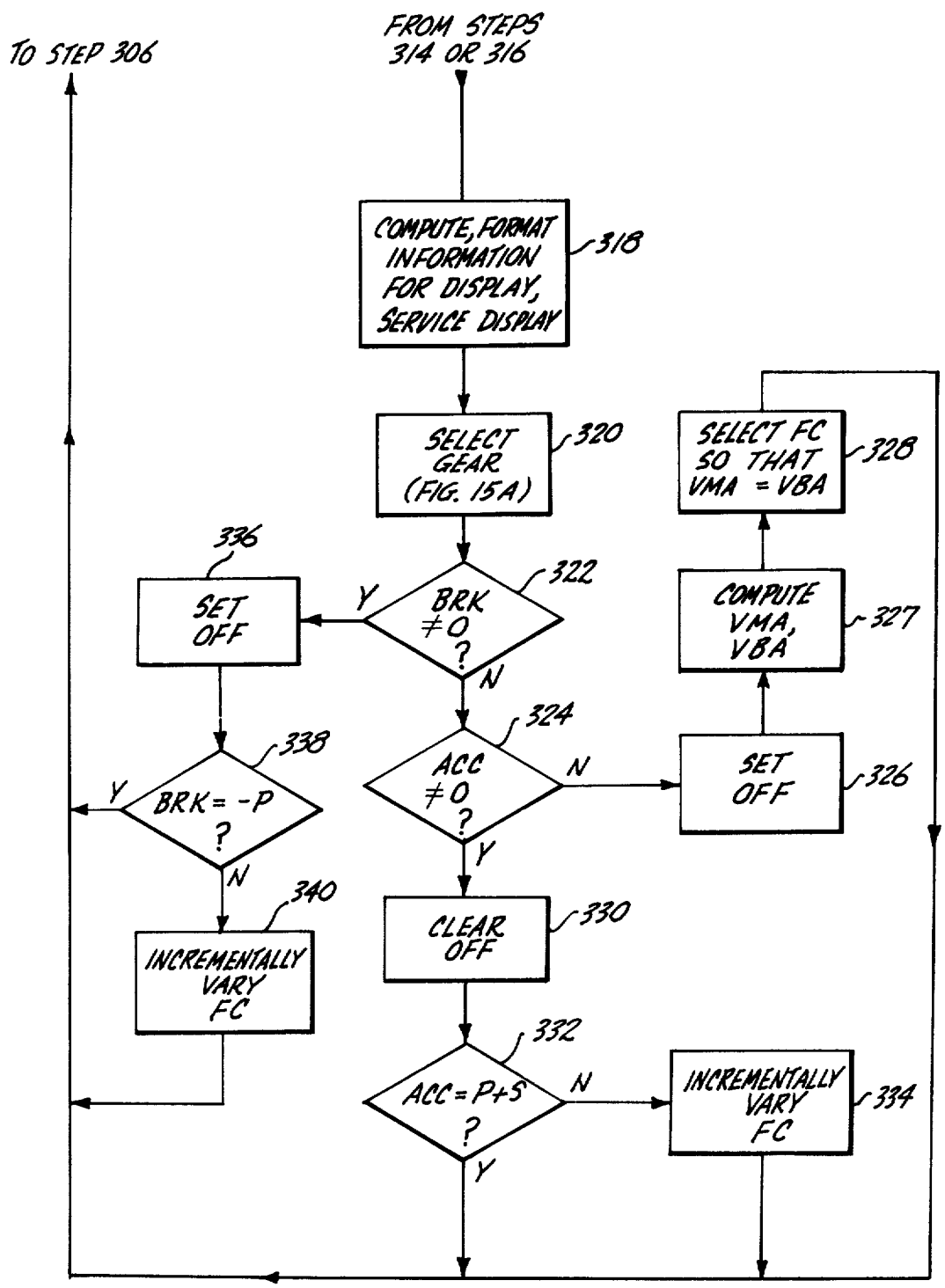
Figure 15A:
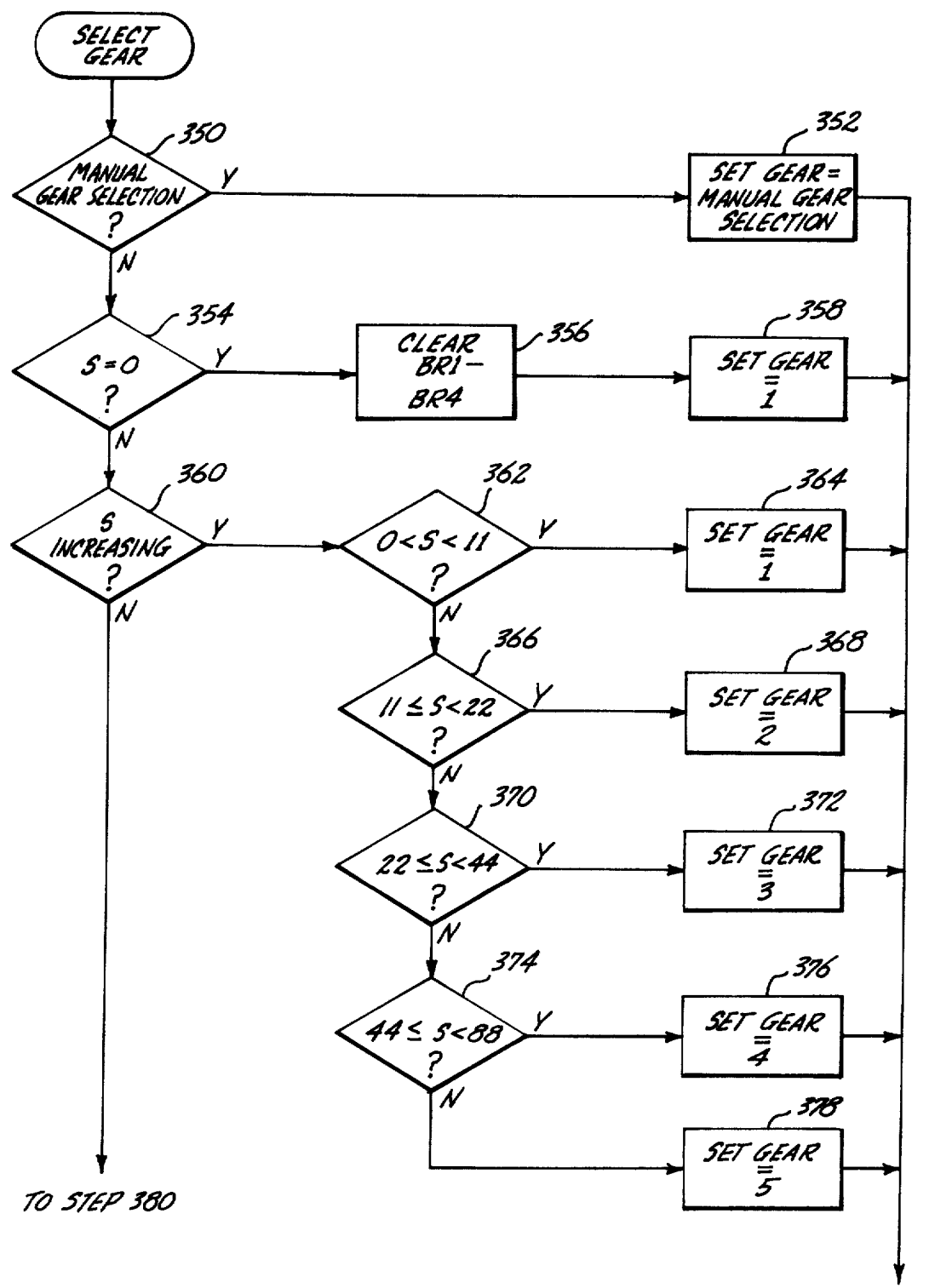
FIGS. 15A and 15B are a flow chart of the program steps executed by the microprocessor in a SELECT GEAR subroutine.
Figure 15B:
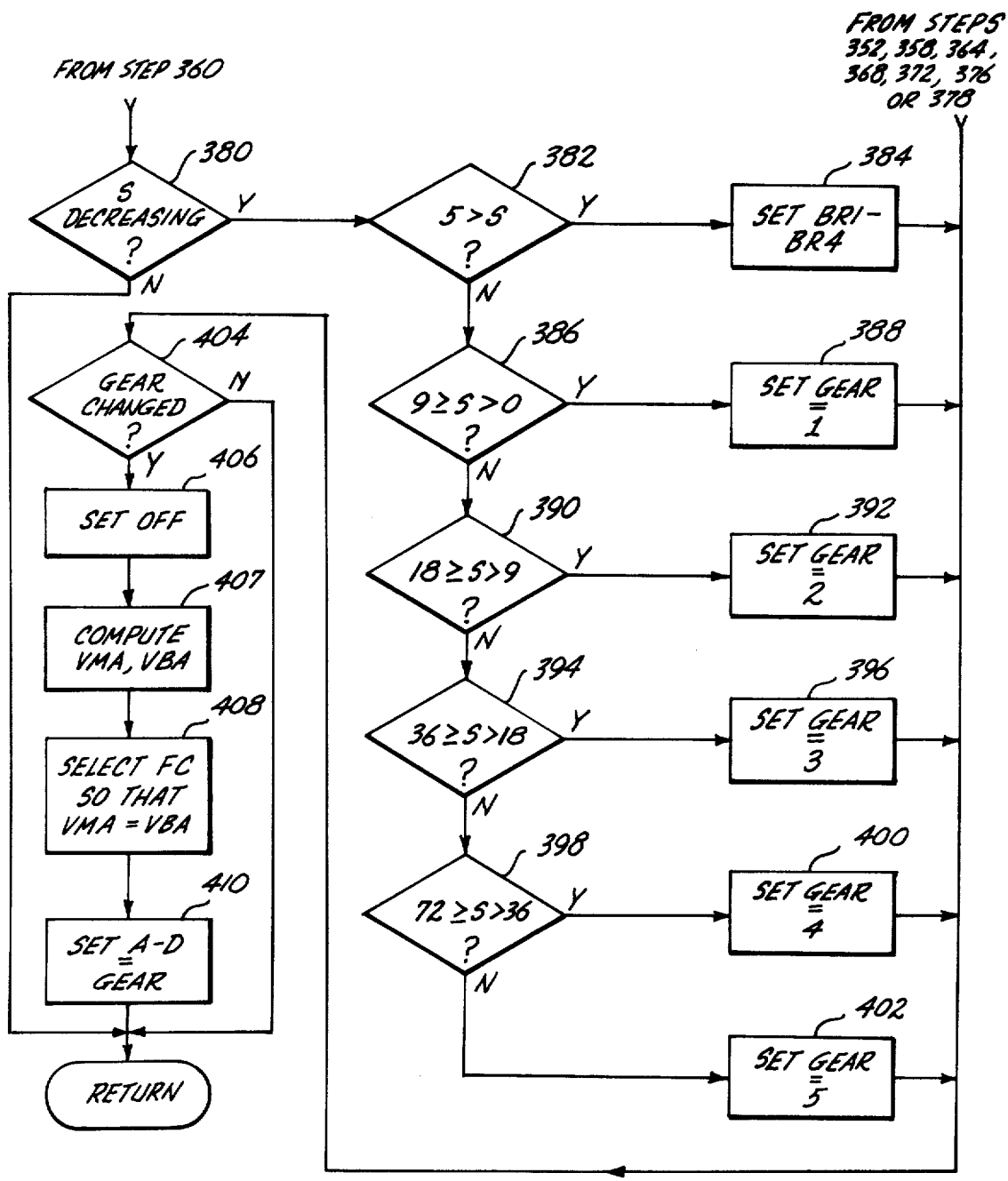

With reference now to FIGS. 14A, 14B, 15A, 15B and 16, the operation of microprocessor 32 will be described. FIGS. 14A and 14B represent the program steps undertaken by microprocessor 32 in a main program loop, and FIGS. 15A and 15B represent the program steps undertaken by microprocessor 32 in a SELECT GEAR subroutine that is called in the main program loop. The set of program instructions representing these program steps are stored in a program memory within microprocessor 32 and executed in a conventional manner.

Referring specifically to FIGS. 14A and 14B, microprocessor 32 detects a POWER ON condition (which occurs when the operator of the vehicle applies power to microprocessor 32 by closing switch 61) and enters, in step 300, an INITIALIZE subroutine wherein certain registers and input/output ports in microprocessor 32 are initialized in a conventional manner. In step 302, microprocessor 32 determines if the disc brakes DB are being actuated by the operator-actuable mechanical linkage connected thereto. If the operator has not released the disc brakes through this mechanical linkage, the determination in step 302 is affirmative, whereupon microprocessor 32 continues to loop through step 302. When the user releases the disc brakes, the determination in step 302 is negative, whereupon microprocessor 32, in step 304, sets an OFF latch. Output signals F/R, OFF, A-D, and BR1-BR4 have each associated therewith a corresponding latch within microprocessor 32, with each output signal being set to the state of its corresponding latch. When the latch is set, the corresponding output signal has a first logic level, and, when the latch is cleared, the corresponding output signal has a second logic level. As an example, when the OFF latch is set (reference step 304), the OFF signal has a first logic level which opens semiconductor switch 182 (FIG. 8) to disable commutation. Output signal FC and the output signals to display 76 have each associated therewith a corresponding register within microprocessor 32, with each output signal being set equal to the contents of its associated register as needed.

Thereafter, microprocessor 32 proceeds to its main program loop and specifically to step 306, wherein the various analog and digital inputs are serviced. Each of the inputs to microprocessor 32 (T1-T4, F1-F4, VB1-VB4, VM1-VM4, I1-I4, ACC, BRK, DBRK, and the signals from keyboard 74) have associated therewith an internal register within microprocessor 32 wherein the information present on the corresponding input is stored during step 306.

In step 308, microprocessor 32 computes the rate of energy transfer P between the main rechargeable batteries and the motors, and the velocity S of the vehicle, by, respectively, taking the average of signals I1-I4 and F1-F4. In step 310, microprocessor determines if a high motor temperature condition exists in any of the motors, by comparing the temperature represented by each of signals T1-T4 with a reference temperature. For purposes of the present discussion, it will be assumed that the determination in step 310 is negative, whereupon microprocessor 32, in step 311, determines if the vehicle is at rest. If the determination in step 311 is affirmative, microprocessor 32 then determines in step 312, if the operator has selected, through keyboard 74, a desired forward propulsion direction of the vehicle. If the determination in step 312 is affirmative, microprocessor 32, in step 314, sets the F/R latch. If the determination in step 312 is negative, microprocessor 32, in step 316, clears the F/R latch. Accordingly, each commutation circuit COM is enabled for either forward or reverse propulsion. If the determination in step 311 is negative, no change is made to the F/R latch since a change in propulsion direction is not permitted when the vehicle is moving.

From either step 314 or step 316, or from step 311 if the determination therein is negative, microprocessor 32 proceeds, in step 318, to compute and format information for display, to store that information in the register associated with display 76 and to service display 76. The information to be displayed will vary depending on the specific application of the system, but may include the charge condition of each battery B1-B4 (obtained from signals VB1-VB4), the speed S, the rate of energy transfer P, and the gear that has been selected.

From step 318, microprocessor 32 proceeds, in step 320, to the SELECT GEAR subroutine in FIG. 15A. Before proceeding to a detailed description of this subroutine and the remaining steps undertaken by microprocessor 32 in its main program loop, it will be helpful to summarize the basic operations undertaken by microprocessor 32 in controlling propulsion and braking.

The gear, or battery voltage that is applied across to each motor, is either manually selected by the operator, through keyboard 74, or automatically selected by microprocessor 32 as a function of the velocity of the vehicle.

During automatic gear selection, each gear has associated therewith a pair of predetermined speed ranges, the first speed range being effective when the velocity of the vehicle is increasing and the second speed range being effective when the velocity of the vehicle is decreasing. The following table sets forth a listing of the gears, and for each gear, a corresponding pair of speed ranges (e.g., SR1, SR1') and typical velocities within each speed range:

TABLE III

| Speed Range | | Velocity (Km/hr) | Gear |
|---|---|---|---|
| SR1 | | $0 \leq S < 11$ | 1 |
| SR2 | Speed | $11 \leq S < 22$ | 2 |
| SR3 | Increasing | $22 \leq S < 44$ | 3 |
| SR4 | | $44 \leq S < 88$ | 4 |
| SR5 | | $88 \leq S$ | 5 |
| SR1' | | $9 > S > 0$ | 1 |
| SR2' | Speed | $18 \geq S > 9$ | 2 |
| SR3' | Decreasing | $36 \geq S > 18$ | 3 |
| SR4' | | $72 \geq S > 36$ | 4 |
| SR5' | | $S > 72$ | 5 |

From Table III, it will be seen that the end points in the first speed range associated with each gear are slightly offset from the end points in the second speed range associated with each gear, e.g., a shift up from gear 1 to gear 2 with increasing velocity is made at approximately 11 km/hr, whereas a shift down from gear 2 to gear 1 with decreasing velocity is made at approximately 9 km/hr. If the end points of the pair of speed ranges associated with each gear were not offset from each other, slight changes in velocity about the end point would cause the relays K1–K4 to continuously cycle, thereby quickly wearing out their contacts.

During automatic gear selection, gear 1 is selected when the vehicle is at rest (S=0). To propel the vehicle to a desired velocity, accelerator pedal 68 (FIG. 2A) is actuated, whereupon commutation is enabled. At the lower end point in each speed range, field current is substantially at a maximum value thereof (FC=FC$_{max}$), and decreases with increasing velocity until the upper end point of the speed range is reached, at which time field current is substantially at a minimum value thereof (FC=0.25 FC$_{max}$). Within each speed range, the field current is incrementally varied in an attempt to satisfy relationship (1) set forth above (ACC=P+S). To brake the vehicle, the brake pedal 72 is actuated, whereupon commutation is disabled. Thereafter, the field current is incrementally varied in an attempt to maintain relationship (2) set forth above (BRK=−P). When braking is being accomplished, the velocity of the vehicle will generally decrease, whereupon field current increases from a minimum value thereof at the upper end point in each speed range to a maximum value thereof at the lower end point in each speed range. Whenever a gear change occurs during either propulsion or braking, notwithstanding whether the vehicle is increasing or decreasing in speed, commutation is disabled for a short time and the field current is adjusted so that the armature voltage of each motor is set equal to the battery voltage across each commutation circuit. For an upshift, field current is changed from substantially 0.25FC$_{max}$ to substantially FC$_{max}$, and, for a downshift, field current is changed from substantially FC$_{max}$ to substantially 0.25 FC$_{max}$. If the armature voltage were not thus brought equal to the battery voltage at a gear change, the resultant relatively large difference therebetween would cause excessive current through the armature winding due to the relatively low impedances of the armature winding and the commutation circuit. When neither the accelerator pedal 68 nor the brake pedal 72 have been actuated, field current will always be controlled so as to maintain the armature voltage equal to the battery voltage, so that no power is transferred between the motors and the batteries. Such a situation may occur either when the vehicle is at rest or is moving (coasting).

Figure 16:
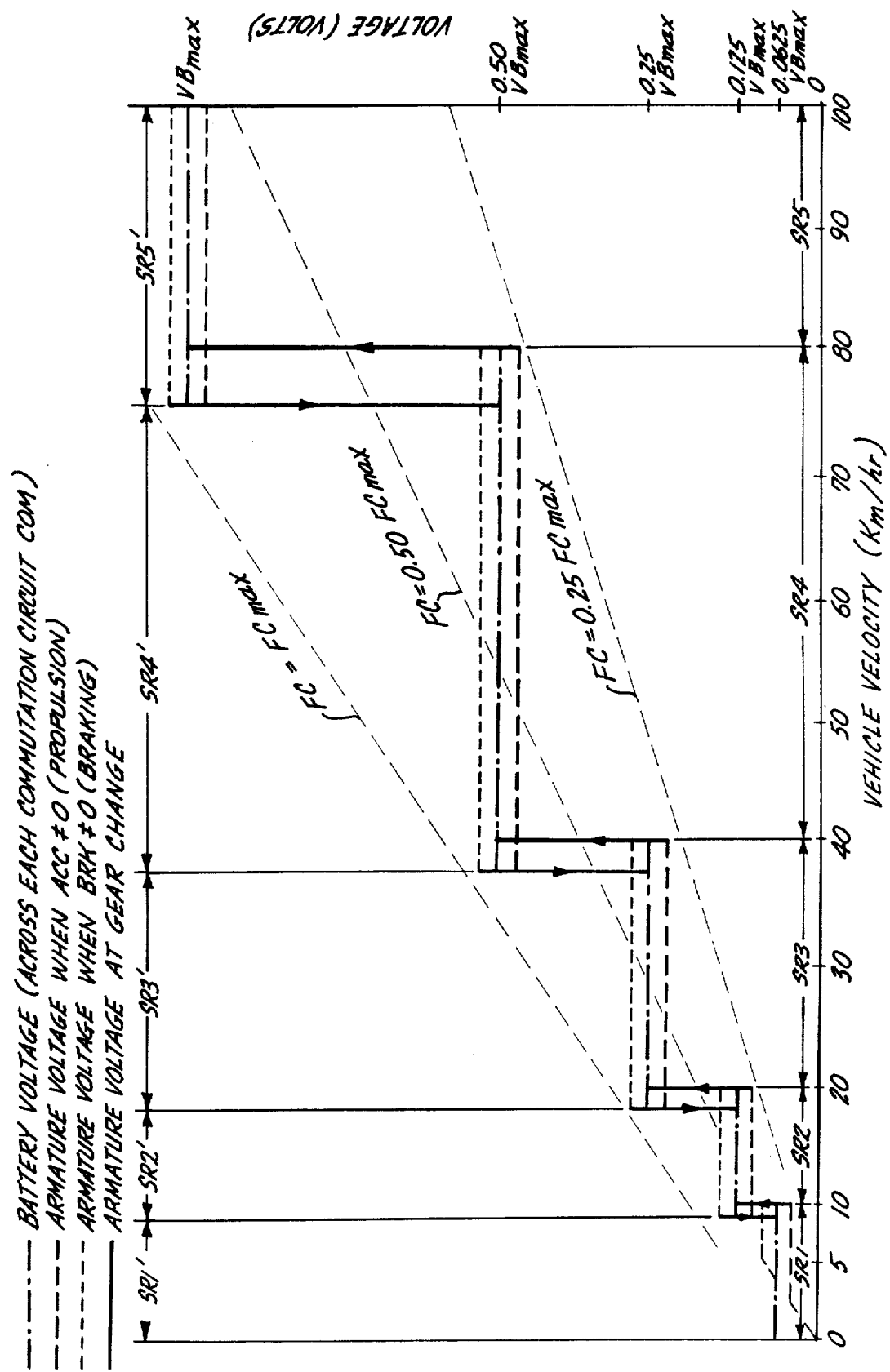
FIG. 16 is a graph illustrating how battery voltage and armature voltage vary with vehicle velocity during operation of the electric propulsion and braking system; and, FIG. 17 is a pictorial view of the front and rear suspensions and drive components of an automotive vehicle incorporating the electric propulsion and braking system.

Referring now to FIG. 16, the operation of the system during a number of commonly encountered situations will be illustrated.

In the first such situation, the vehicle is at rest, and the operator has actuated accelerator pedal 68 to a position that will result in the vehicle accelerating to a speed of 90 km/hr. At rest, gear 1 and speed range SR1 is selected (0.0625 VB$_{max}$). When commutation is enabled, the armature voltage of each motor increases with increasing speed up to a point where the armature voltage is below the battery voltage across the associated commutation circuit by an amount equal to the voltage drop in the commutation circuit. Thereafter, the field current is incrementally decreased, with increasing velocity in an attempt to satisfy relationship (1). At the lower end point of speed range SR2, commutation is disabled, gear 2 is selected (0.125 VB$_{max}$), the field current is adjusted so that the armature voltage equals the battery voltage, and commutation is again enabled, whereupon the armature voltage drops below that of the battery voltage by an amount equal to the voltage drop in the commutation circuit. Thereafter, field current is incrementally decreased with increasing velocity until the lower end point of speed range SR3 is reached and an upshift to gear 3 is made. The operation proceeds in a similar manner until the desired velocity is reached and relationship (1) is satisfied.

In the second such situation, the operator slightly releases accelerator pedal 68 (ACC decreases but is greater than zero) while the vehicle is traveling at 90 km/hr. Relationship (1) is not now satisfied, whereupon field current is incrementally increased as velocity decreases. At the upper end point of speed range SR4, commutation is interrupted, the gear is changed (from gear 5, VB$_{max}$ to gear 4, 0.50 VB$_{max}$), the field current is adjusted so that the armature voltage equals the battery voltage, and commutation is enabled, whereupon the field current is again incrementally increased until relationship (1) is satisfied.

In the third such situation, the vehicle is traveling at 60 km/hr, and the operator actuates brake pedal 72 until the vehicle is brought to rest. Commutation is disabled, and the field current is increased until the armature voltage exceeds the battery voltage by the forward voltage drop of diodes 194 in commutation circuit COM. Thereafter, the field current is incrementally increased in order to maintain relationship (2). When the upper end point of speed range SR3' is reached, a shift from gear 4 (0.50 VB$_{max}$) to gear 3 (0.25 VB$_{max}$) is made and the field current is adjusted so that the armature voltage equals the battery voltage. Thereafter, the field current is increased until the armature voltage exceeds the battery voltage by the forward voltage drop of diodes 194, and is thereafter incrementally increased in order to maintain relationship (2). Similar operations occur until a downshift from gear 2 to gear 1 (at the upper end point of speed range SR1'). After this gear change has been made, the field current is again incrementally increased. However, at some point (e.g., 5 km/hr), the armature voltage begins to decrease so that braking action is lost. At this point, the disc brakes DB are actuated to bring the vehicle to rest.

In the fourth such situation, the vehicle is moving at 60 km/hr and, the operator releases both accelerator pedal 68 and brake pedal 72 (ACC=0, BRK=0). Commutation is disabled, and the field current is adjusted so that the armature voltage equals the battery voltage. As the velocity of the vehicle thereafter increases or decreases, the field current is incrementally decreased or increased so as to maintain the armature voltage equal to the battery voltage. If the operator should then actuate either accelerator pedal 68 or brake pedal 72, excessive current in the armature winding is avoided.

Referring now to the SELECT GEAR subroutine in FIGS. 15A and 15B, microprocessor 32, in step 350, determines if the operator has manually selected a gear (through keyboard 74). If the determination in step 350 is affirmative, microprocessor 32, in step 352, stores the manual gear selection in a GEAR register. If the determination in step 350 is negative, microprocessor 32, in step 354, determines if the vehicle is at rest. If the determination in step 354 is affirmative, microprocessor 32, in step 356, clears the BR1-BR4 latches, thereby releasing the disc brakes DB, and then, in step 358, stores gear 1 in the GEAR register. If the determination in step 354 is negative, microprocessor 32, in step 360, determines if the velocity of the vehicle is increasing. If the determination in step 360 if affirmative, microprocessor 32, in steps 362, 364, 366, 368, 370, 372, 374, 376 and 378, determines the speed range SR1-SR5 from the velocity of the vehicle, and stores the appropriate gear in the GEAR register.

If the determination in step 360 is negative, microprocessor 32 determines, in step 380, if the velocity of the vehicle is decreasing. If the determinative in step 380 is affirmative, microprocessor 32, in step 382, determines if the velocity of the vehicle is less than the minimum value at which braking can be effected by the motors (e.g., 5 km/hr). If the determination in step 382 is affirmative, microprocessor 32, in step 384, sets the BR1-BR4 latches, whereby the disc brakes DB are actuated. If the determination in step 382 is negative, microprocessor 32, in steps 386, 388, 390, 392, 394, 396, 398, 400 and 402, determines the speed range SR1'-SR5' from the velocity of the vehicle, and stores the appropriate gear in the GEAR register.

If the determinations in steps 350, 354, 360 and 380 are each negative, the vehicle is moving at a constant speed and no gear has been changed, whereby microprocessor 32 returns to its main progam loop (FIG. 14B). If the determinations in any of steps 350, 354, 360 or 380 are affirmative, however, a gear may have been changed, so that microprocessor 32 proceeds from one of steps 352, 358, 364, 368, 372, 376, 378, 384, 388, 392, 396, 400 or 402 to step 404. If the gear has not been changed (e.g., the contents of the GEAR register remain unchanged), the determination in step 404 is negative, whereupon microprocessor 32 returns to its main program loop. If the gear has been changed, however, the determination in step 404 is affirmative, whereupon microprocessor 32, in step 406, sets the OFF latch to disable commutation. In step 407, microprocessor 32 computes an average armature voltage VMA by taking the average of signals VM1-VM4, and computes an average battery voltage VBA by combining signals VB1-VB4 in accordance with the selected combination of main batteries and motors represented by the gear now stored in the GEAR register. Thereafter, in step 408, microprocessor 32 adjusts the field current (by selecting FC) so that the average armature voltage VMA equals the average battery voltage VBA. In step 410, microprocessor 32 then sets the A-D latches in accordance with the gear stored in the GEAR register. From step 410, microprocessor 32 returns to its main program loop.

With reference now back to FIG. 14B, microprocessor 32, having thus selected a gear in step 320, proceeds, in step 322, to determine if brake pedal 72 has been actuated. If the determination in step 322 is negative, microprocessor 32 determines, in step 324, if the accelerator pedal 68 has been actuated. If the determinations in both steps 322 and 324 are negative, the vehicle is either at rest or is coasting, whereupon microprocessor 32, in step 326, sets the OFF latch, thus disabling commutation. In step 327, microprocessor 32 computes the average armature voltage VMA and the average battery voltage VBA as previously described (reference step 407). In step 328, microprocessor 32 adjusts the field current, by selecting FC, so that the average armature voltage VMA equals the average battery voltage VBA. Thereafter, microprocessor 32 returns to the beginning of its main program loop and specifically to step 306.

If the operator has actuated the acceleration pedal 68 so that the determination in step 324 is affirmative, microprocessor 32 proceeds, in step 330, to clear the OFF latch, thereby enabling commutation, and thereafter, in step 332, determines if relationship (1) is satisfied (by comparing signal ACC with the actual rate of energy transfer P and the valocity S). If the determination in step 332 is negative, microprocessor 32, in step 334, incrementally varies the field current, by incrementally varying the value stored in the FC register. The value stored in the FC register will be incrementally increased when vehicle velocity is decreasing, and will be incrementally decreased when vehicle speed is increasing. From step 334, microprocessor 32 returns to the beginning of its main program loop. For as long as the accelerator pedal 68 is actuated and relationship (1) is not satisfied, microprocessor 32 will continue to incrementally vary the field current in the manner described. When relationship (1) is satisfied, the determination in step 332 is affirmative, whereupon microprocessor 32 returns to the beginning of its main program loop without effecting any change in field current.

If the operator actuates the brake pedal 72, the determination in step 322 is affirmative, whereupon microprocessor 32, in step 336, sets the OFF latch to disable commutation and then determines, in step 338, if relationship (2) is satisfied. If the determination in step 338 is negative, microprocessor 32 proceeds, in step 340, to incrementally vary the field current by incrementally varying the value stored in the FC register. From step 340, microprocessor 32 returns to the beginning of its main program loop. For as long as brake pedal 72 is actuated and relationship (2) is not satisfied, microprocessor 32 will continue to incrementally vary the field current. As previously described the field current will be incrementally increased as the vehicle velocity decreases. When relationship (2) is satisfied, the determination in step 338 is affirmative, whereupon microprocessor 32 returns to the beginning of its main program loop without effecting any further change in field current.

Let it now be assumed that a high motor temperature condition exists in one of the motors. As a result, the determination in step 310 (FIG. 14A) is affirmative, whereupon microprocessor 32 proceeds, in step 346, to determine if the accelerator pedal 68 is actuated. If the determination in step 346 is affirmative, microprocessor 32, in step 348, increases the field current by increasing the value stored in the FC register so as to decrease the power being transferred from the batteries to the motors. From step 348, microprocessor 32 returns to the beginning of its main program loop and continues to loop through steps 306, 308, 310, 346 and 348 until the high motor temperature condition terminates. If the determination in step 346 is negative, the vehicle is either coasting or being braked, and no change is made to field current since the high motor temperature condition will quickly terminate when no power is being transferred to the motors and since braking takes priority over motor overheating. Accordingly, microprocessor 32 proceeds through the remainder of its main program loop and specifically to step 311.

With reference now to FIG. 17, the front and rear suspensions and drive components of an automotive vehicle incorporating the electric propulsion and braking system are illustrated. As previously described, wheels $22_1$, $22_2$, $22_3$ and $22_4$ are each rotated and braked by respective motors $24_1$, $24_2$, $24_3$ and $24_4$ through associated fixed-ratio, mechanical transmissions $26_1$, $26_2$, $26_3$ and $26_4$. The front suspension and drive components on each side of the vehicle are similar, as are the rear suspension and drive components. Accordingly, only those components associated with motor $24_1$, transmission $26_1$ and wheel $22_1$, and with motor $24_3$, transmission $26_3$ and wheel $22_3$ will be described.

Motor $24_1$ is supported from the frame (not illustrated) of the vehicle, and its output shaft (i.e., reduced-diameter portion 92B, FIG. 3) extends toward the interior of the automotive vehicle and has fitted thereon a gear 220 which is located within a housing 221. Gear 220 meshes with a second gear 222 affixed to a shaft 224 rotatably journaled in housing 221, with shaft 224 extending towards the associated wheel $22_1$. The transmission ratio of gears 220 and 222 is preferably 1:5. Shaft 224 is coupled by a flexible coupling 226 to a shaft 228 which in turn is coupled by a universal joint 230 to a shaft 232 itself rotatably journaled in a housing 234. A gear 233 is fitted on shaft 232 within housing 234 and meshes with a second gear in housing 234. The transmission ratio of gears 233 and 235 is preferably 1:5. Wheel $22_1$ is fitted on a portion of shaft 236 that extends beyond housing 234. The lower end of housing 234 is supported by a ball joint 236 mounted on a control arm 238 pivotably supported from the frame of the automotive vehicle. The upper end of housing 234 is pivotably supported on the lower end of a shock absorber and strut 240 whose upper end is secured to the frame of the automotive vehicle. Accordingly, housing 234 and wheel $22_1$ are free to rotate about the pivot points established by ball joint 237 and the lower end of shock absorber and strut 240, and to otherwise move with respect to the frame of the vehicle due to the suspension provided by wishbone 238 and shock absorber and strut 240.

To steer the vehicle, a steering wheel shaft 242 is coupled by motion converter 244 to a tie rod 246, one end of which is connected by a flexible coupling 248 to an arm 250 pinned to housing 234.

Motor $24_3$ is also mounted on the frame of the automotive vehicle so that its output shaft extends toward the interior of the vehicle. This output shaft is coupled through a pair of gears, not illustrated, in housing 258 to shaft 260 which extends towards wheel $22_3$. The arrangement, type and transmission ratio of the gears within housing 258 is identical to that of gears 220 and 222 in housing 221. Shaft 260 is connected by a flexible coupling 262 to a shaft 264 which in turn is coupled by a universal joint 266 to a shaft 268 rotatably journaled in a housing 270. A shaft 273 is also rotatably journaled in housing 270 and has a portion extending beyond housing 270 onto which wheel $22_3$ is fitted. A pair of gears, not illustrated, in housing 270 couple shaft 268 to shaft 272, with the arrangement, type and transmission ratio of these gears being identical to that of gears 233, 235 in housing 234. Housing 270 is rigidly attached to a trailing arm 273 pinned to the frame of the vehicle, and is also pinned to the lower end of a shock absorber and strut 274 whose upper end is secured to the frame of the vehicle.

Those skilled in the art will recognize the suspension components in FIG. 16 as being similar to those used in conventional compact automotive vehicles such as the Audi Fox. The suspension and drive components are particularly distinguished from those previously known in providing propulsion and braking of each wheel of the automotive vehicle through an associated, individual electrical motor, and in eliminating the conventional hydraulic brake assembly associated with each wheel (since all braking is done through the motors).

While the invention has been described with reference to a preferred embodiment, it is to be clearly understood that the invention is not limited thereto. Rather, the scope of the invention is to be interpreted only in conjunction with the appended claims.

The embodiments of the invention in which an exclusive property or privilege is claimed are defined as follows:

1. An electric propulsion and braking system for an automotive vehicle having a plurality of wheels, said system comprising:
   a plurality of main electrical energy sources, each said main electrical energy source being adapted to provide a first dc voltage of a predetermined magnitude across a pair of terminals thereof;
   an auxiliary electrical energy source which is adapted to provide a second dc voltage of a predetermined magnitude across a pair of terminals thereof;
   a plurality of high-speed, dc electrical motors, each said motor being associated with one of the plurality of wheels of the vehicle and including: a rotor; a field winding supported on said rotor, said field winding having a pair of terminals; a stator; a multiphase armature winding supported on said stator, said armature winding having a plurality of terminals; and, a commutation circuit connected to said plurality of terminals of said armature winding, said commutation circuit having a pair of terminals and being operative, when enabled, to commutate a third dc voltage applied to said pair of terminals thereof so as to result in the application of potentials to said plurality of terminals of said armature winding which produce a magnetic field that rotates in substantial synchronism with a magnetic field produced by field current in said field winding, and being operative, when disabled, to couple one of said plurality of terminals of said armature winding to one of said pair of terminals of said commutation circuit whenever the potential on said one of said plurality of terminals of said armature winding that results from a voltage induced in said armature winding by the magnetic field of said field winding exceeds the potential on said one of said pair of terminals of said commutation circuit resulting from the third dc voltage applied to said pair of terminals of said commutation circuit;

a plurality of transmission means, each said transmission means being adapted to mechanically couple one of said rotors to its associated wheel and having a fixed transmission ratio;

first means for varying the third dc voltage applied across the pair of terminals of each said commutation circuit, said first means including: a positive main bus; a negative main bus; means coupled to said pair of terminals of each of said plurality of main electrical energy sources for selectively connecting said main electrical energy sources all in series, all in parallel, or in series/parallel with said positive and negative main busses; means coupled to said pair of terminals of each of said commutation circuits and responsive to a second control signal for selectively connecting said commutation circuits all in series, all in parallel, or in series/parallel with said positive and negative main busses;

second means for varying the field current in each said field winding, said second means including: a positive auxiliary bus coupled to one of said pair of terminals of said auxiliary electrical energy source; a negative auxiliary bus coupled to the other of said pair of terminals of said auxiliary electrical energy source; and, means coupled to said pair of terminals of each of said field windings and responsive to a third control signal for selectively connecting said field windings all in series, all in parallel, or in series/parallel with said positive and negative auxiliary busses; and, third means for enabling propulsion of the vehicle by enabling each said commutation circuit, for enabling braking of the vehicle by disabling each said commutation circuit, and for varying the amount of propulsion and braking by providing said first and second control signals to said first means and said third control signal to said second means.

2. A system as recited in claim 1, wherein said means responsive to said first control signal and said means responsive to said second control signal each include a plurality of electromechanical relays.

3. A system as recited in claim 1, wherein said means responsive to said third control signal includes: a plurality of unidirectional conducting means connecting said field windings in series circuit with said positive and negative auxiliary busses; and, a plurality of switchable semiconductor devices adapted to connect said field windings all series, all in parallel, or in series/parallel with said positive and negative auxiliary busses.

4. A system as recited in claim 3, wherein said third control signal represents a desired magnitude of field current in each said field winding, and wherein said means responsive to said third control signal further includes: a logic circuit responsive to said third control signal for enabling energization of selected ones of said plurality of switchable semiconductor devices to accordingly select either a series, parallel, or series/parallel connection of said connection of said field windings with said positive and negative auxiliary busses; means coupled with one of said positive and negative auxiliary busses for providing a signal representing the actual field current in each said field winding; means for comparing said third control signal with said signal representing actual field current in each said field winding to provide an alternating signal whose duty-cycle is representative of the difference between said desired field current and said actual field current; and, wherein said logic circuit is further operative to duty-cycle, in accordance with said alternating signal, those ones of said plurality of switchable semiconductor devices that have been selectively energized in response to said third control signal.

5. A system as recited in claim 1, wherein said multiphase armature winding in each of said motors is a three-phase winding having first, second and third terminals; and, wherein each said commutation circuit includes:

sensor means adapted to provide first, second and third shaft position signals each having successive first and second logic levels for each revolution of the output shaft of its associated motor, each of said shaft position signals being shifted in phase by 120° from each other of said shaft position signals;

a source of a high-frequency alternating current signal;

first drive means for converting said high-frequency, alternating current signal into first, second and third drive signals in respective substantial synchronism with the first logic levels of said first, second and third shaft position signals;

second drive means for converting said high-frequency, alternating current signal into fourth, fifth and sixth drive signals in respective substantial synchronism with the second logic levels of said first, second and third shaft position signal;

switch means for applying said high-frequency, alternating current signal to said first and said second drive means when said commutation circuit is enabled, and for removing said high-frequency, alternating current signal from said first and second drive means when said commutation circuit is disabled;

an armature switching matrix including: first, second and third semiconductor switching means respectively responsive to said first, second and third drive signals for connecting said first, second and third terminals of said armature winding to one of said pair of terminals of said commutation circuit; fourth, fifth and sixth semiconductor switching means respectively responsive to said fourth, fifth and sixth drive signals for connecting said first, second and third terminals of said armature winding to the other of said pair of terminals of said commutation circuit; and, a plurality of unidirectional conducting means each respectively connected in reverse-parallel with one of said first, second, third, fourth, fifth and sixth semiconductor switching means.

6. A system as recited in claim 5, wherein each of said first, second, third, fourth, fifth and sixth semiconductor switching means comprises a power transistor.

7. A system as recited in claim 5, wherein each of said plurality of unidirection conducting means comprises a diode.

8. A system as recited in claim 5, wherein said third means is further operative to provide a signal representing a desired reverse propulsion direction of the vehicle; and, wherein each of said commutation circuits further includes means responsive to said signal representing a desired reverse propulsion direction for inverting the logic levels of said first, second and third shaft position signals that are supplied to said first and second drive means.

9. A system as recited in claim 5, wherein each of said sensor means includes: a disc affixed to and rotatable with the output shaft of its associated motor, said disc having first and second regions of opposite magnetic polarity, each said region extending through substantially one half of said disc; and, a plurality of magnetic sensors spaced at 120° intervals about the periphery of said disc and respectively providing said first, second and third shaft position signals upon rotation of said disc.

10. A system as recited in claim 9, wherein each of said magnetic sensors comprises a Hall-effect sensor.

11. A system as recited in claim 5, wherein said first drive means includes:
first, second and third bilateral semiconductor devices each having a pair of main current-carrying terminals and a gate terminal;
means connecting said switch means and said signal source in a series circuit with the main current-carrying terminals of each of said first, second and third bilateral semiconductor devices;
means applying said first, second and third shaft position signals to said gate terminals of said first, second and third bilateral semiconductor devices, respectively;
first, second and third filter and rectifier circuits each having an input and an output; and,
first, second and third transformers whose primary windings are respectively connected in the series circuits including the main current-carrying terminals of said first, second and third bilateral semiconductor devices and whose secondary windings are connected, respectively, to the inputs of said first, second and third filter and rectifier circuits, whereby said first, second and third drive signals appear on the outputs of said first, second and third filter and rectifier circuits.

12. A system as recited in claim 11, wherein said second drive means includes:
fourth, fifth and sixth bilateral semiconductor devices each having a pair of main current-carrying terminals and a gate terminal;
means connecting said switch means and said signal source in a series circuit with the main current-carrying terminals of each of said fourth, fifth and sixth bilateral semiconductor devices;
means for inverting the logic levels of said first, second and third shaft position signals, and for applying the thus-inverted first, second and third shaft position signals to said gate terminals of said fourth, fifth and sixth bilateral semiconductor devices, respectively;
fourth, fifth and sixth filter and rectifier circuits each having an input and an output; and,
fourth, fifth and sixth transformers whose primary windings are respectively connected in the series circuits including the main current-carrying terminals of said fourth, fifth and sixth bilateral semiconductor devices and whose secondary windings are connected to the inputs of said fourth, fifth and sixth filter and rectifier circuits, whereby said fourth, fifth and sixth drive signals appear on the outputs of said fourth, fifth and sixth filter and rectifier circuits.

13. A system as recited in claim 1, wherein the nominal maximum rotational speed of each of said motors is substantially 15,000 rpm.

14. A system as recited in claim 12, wherein the fixed transmission ratio of each of said plurality of transmission means is substantially 1:25.

15. A system as recited in claim 1, wherein the vehicle has four wheels and wherein said plurality of motors consist of four motors.

16. A system as recited in claim 15, wherein each of said plurality of motors has a horsepower rating in the range of 10–15 horsepower.

17. A system as recited in claim 15, wherein said plurality of main electrical energy sources consist of four main electrical energy sources.

18. A system as recited in claim 1 or claim 17, wherein each said main electrical energy source includes a rechargeable battery.

19. A system as recited in claim 18, wherein said auxiliary electrical energy source includes an auxiliary battery.

20. A system as recited in claim 19, wherein said auxiliary battery is a rechargeable battery, and wherein said system further comprises a charging circuit for recharging said auxiliary battery from said positive and negative main busses.

21. An electric propulsion and braking system for an automotive vehicle having a plurality of wheels, said system comprising:
a plurality of high-speed, dc motors, each of said motors including a rotatable output shaft, an armature winding, a field winding that is adapted for excitation separate from excitation of said armature winding, and a commutation circuit coupled with said armature winding, said commutation circuit having a pair of terminals and being adapted, when enabled, to commutate a dc source voltage applied across the pair of terminals of said commutation circuit so as to develop an armature voltage across said armature winding to accordingly enable transfer of electrical energy to said armature winding, whereby said motor exerts a rotational force on said output shaft, said commutation circuit being adapted, when disabled, to couple the armature voltage across said armature winding to said pair of terminals of said commutation circuit so as to enable transfer of electrical energy from said armature winding, whereby said motor exerts a braking force on said output shaft when said armature voltage exceeds the dc source voltage applied across said pair of terminals of said commutation circuit, the magnitude of said rotational and braking forces being dependent on the magnitude of the dc source voltage across said commutation circuit and the magnitude of field current through said field winding;
a plurality of fixed-ratio mechanical transmissions each being adapted to couple the output shaft of one of said plurality of motors to one of the plurality of wheels;
first control means including a plurality of main electrical energy sources for applying, in response to a first control signal, one of a plurality of dc source voltages to said pair of terminals of each of said commutation circuits, each said dc source voltage having a predetermined magnitude which represents a gear of the vehicle and which differs from the predetermined magnitude of each other said dc source voltage;

second control means including an auxiliary energy source for varying, in response to a second control signal, the field current in each said field winding; and third control means for enabling propulsion and braking by respectively enabling and disabling said commutation circuits, and for varying the level of rotational and braking forces developed during propulsion and braking by providing said first and said second control signals to said first and said second control means, respectively.

22. A system as recited in claim 21, wherein said third control means includes:

a power sensor for providing a power signal representing the actual rate of energy electrical transfer to and from said plurality of motors;

a speed sensor for providing a speed signal representing the actual velocity of the vehicle;

means for providing a propulsion level signal representing a desired level of propulsion of the vehicle;

means for providing a brake level signal representing a desired level of braking of the vehicle; and, a data processor which functions under control of a stored program and which is operative;

to receive said power, speed, propulsion level and braking level signals;

in response to said propulsion level signal, to enable each said commutation circuit, and, when each said commutation circuit is so enabled, to respond to said power, speed and propulsion level signals to select, through said first control signal, a gear of the vehicle as a function of the actual velocity of the vehicle, and, to incrementally vary, through said second control signal, the actual field current in each said field winding so as to maintain the actual rate of electrical energy being transferred to said plurality of motors substantially equal to the sum of the desired level of propulsion and the actual velocity of the vehicle;

in response to said braking level signal, to disable each said commutation circuit and, when each said commutation circuit is so disabled, to respond to said power, speed and braking level signals to select, through said first control signal, a gear of the vehicle as a function of the velocity of the vehicle and, to incrementally vary, through said second control signal, the actual field current in each said field winding so as to maintain the actual rate of electrical energy being transferred from said motors substantially equal to the desired level of braking.

23. A system as recited in claim 22, wherein said third control means further includes:

means for providing a dc source voltage signal representing the magnitude of the dc source voltage applied across the pair of terminals of each said commutation circuit;

means for providing an armature voltage signal representing the magnitude of the armature voltage across each said armature winding; and, wherein said data processor is further operative: to receive said dc source voltage and armature voltage signals; in response to absence of said propulsion level and braking level signals, to disable each said commutation circuit, and, when each said commutation circuit is so disabled, to respond to said speed, dc source voltage and armature voltage signals to select, through said first control signal, a gear of a vehicle as a function of the actual velocity of the vehicle, and to incrementally vary, through said second control signal, the actual field current in each said field winding so as to maintain the armature voltage across each said armature winding substantially equal to the dc source voltage across the pair of terminals of each said commutation circuit 24. A system as recited in claim 23, wherein said data processor is further operative, at the time that the gear of the vehicle is changed, to respond to said dc source voltage and armature voltage signals to momentarily disable each said commutation circuit, and, when each said commutation circuit is so momentarily disabled, to adjust, through said second control signal, the actual field current in each said field winding so that the armature voltage across each said armature winding is substantially equal to the dc source voltage across the pair of terminals of each said commutation circuit.

25. A system as recited in claim 22, wherein said data processor has stored therein a plurality of predetermined speed ranges, each said speed range being uniquely associated with one gear of the vehicle and representing a range of vehicle velocities between lower and upper end points thereof; and, wherein said data processor is further operative to compare the actual velocity of the vehicle represented by said speed signal with said plurality of predetermined speed ranges and to select the gear of the vehicle accordingly.

26. A system as recited in claim 25, wherein said plurality of predetermined speed ranges include a plurality of first speed ranges and a plurality of second speed ranges, said first and said second speed ranges being associated in pairs with each pair being uniquely associated with one gear of the vehicle, the lower and upper end points of the first speed range in each pair being offset from the lower and upper end points of the second speed range in each pair;

and, wherein said data processor is responsive to said speed signal to select one of said first speed ranges when vehicle velocity is increasing and to select one of said second speed ranges when vehicle velocity is decreasing.

27. A system as recited in claim 22, further comprising means for providing a gear selection signal representing a desired manual selection of one of said gears; and, wherein said data processor is further operative to receive said gear selection signal, and, in response to said gear selection signal, to select, through said first control signal, the gear represented by said gear selection signal.

28. A system as recited in claim 22, wherein each said motor has operatively associated therewith a temperature sensor for providing a temperature signal representing the temperature of its associated motor; and, wherein said data processor is further operative to receive each said temperature signal, and, upon detection of a high motor temperature condition in any of said motors represented by its associated temperature signal, to increase, through said second control signal, the actual field current in each said field winding during propulsion until said high motor temperature condition terminates.

29. A system as recited in claim 22, wherein each said motor has operatively associated therewith a disc brake which, when actuated, exerts a mechanical braking force on the output shaft of its associated motor; and, wherein said data processor is responsive to said speed signal to actuate each said disc brake when the velocity of the vehicle decreases below a predetermined value.

30. A system as recited in claim 21, wherein said means for providing a propulsion level signal and said means for providing a braking level signal each comprise: a manually-actuable pedal, said pedal having a rest position; and, an encoder operatively associated with said pedal for providing an output signal representing the amount of displacement of said pedal from said said rest position.

31. A system as recited in claim 29, wherein said pedal is manually-rotatable from its rest position to a fully-actuated position, and wherein said encoder includes: a code disc rotatable with said pedal, said code disc having located thereon encoded information in the form of a plurality of annular tracks, each said annular track representing a bit of the encoded information, said tracks each beginning at a common start radius on said code disc and each terminating at a common end radius on said code disc, said encoded information increasing in value from said start radius to said stop radius; a plurality of sensors each adapted to provide an electrical signal representing the encoded information in one of said tracks, said start radius on said code disc being proximate to said plurality of sensors when said pedal is in its rest position and said end radius on said code disc being proximate to said plurality of sensors when said pedal is in its fully-actuated position; and, a logic circuit for combining said electrical signals from said plurality of sensors to provide said output signal.

32. A system as recited in claim 29, wherein said code disc includes a first sector adjoining said start radius, said first sector being substantially free of encoded information and being proximate to said plurality of sensors when said pedal is in its rest position.

33. A system as recited in claim 32, wherein said code disc includes a second sector adjoining said end radius, said second sector including only that one of said tracks that represents the most significant bit of the encoded information and being proximate to said plurality of sensors when said pedal is in its fully-actuated position.

34. A system as recited in claim 31, wherein the encoded information stored on said code disc is encoded in a gray code.

35. A system as recited in claim 30, wherein the encoded information stored on said code disc is optically readable, and wherein each of said plurality of sensors comprises an optical sensor.

* * * * *